US012807759B2

(12) United States Patent
Arnold et al.

(10) Patent No.: US 12,807,759 B2
(45) Date of Patent: Nov. 24, 2026

(54) USE OF A COMPOSITION COMPRISING A POLYAMINOAMIDE TYPE COMPOUND FOR COPPER NANOTWIN ELECTRODEPOSITION

(71) Applicant: BASF SE, Ludwigshafen am Rhein (DE)

(72) Inventors: Marco Arnold, Ludwigshafen am Rhein (DE); Alexander Fluegel, Ludwigshafen am Rhein (DE); Nadine Engelhardt, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/880,588

(22) PCT Filed: Jun. 29, 2023

(86) PCT No.: PCT/EP2023/067920
§ 371 (c)(1),
(2) Date: Jan. 2, 2025

(87) PCT Pub. No.: WO2024/008562
PCT Pub. Date: Jan. 11, 2024

(65) Prior Publication Data

US 2025/0388725 A1 Dec. 25, 2025

(30) Foreign Application Priority Data

Jul. 7, 2022 (EP) ..................................... 22183676
Apr. 6, 2023 (EP) ..................................... 23167077

(51) Int. Cl.
*C25D 3/38* (2006.01)
*C08G 73/02* (2006.01)
*C25D 5/00* (2006.01)

(52) U.S. Cl.
CPC ............. *C08G 73/028* (2013.01); *C25D 3/38* (2013.01); *C25D 5/617* (2020.08)

(58) Field of Classification Search
CPC ............. C25D 3/38; C25D 5/60; C25D 5/615
(Continued)

(56) References Cited

U.S. PATENT DOCUMENTS 4,319,019 A 3/1982 Lehmann et al.
5,435,898 A 7/1995 Commander et al.
(Continued)

FOREIGN PATENT DOCUMENTS

CN 109232299 A * 1/2019 ............. C09K 23/00
EP 3901331 A1 * 10/2021 ............... C25D 3/38
(Continued)

OTHER PUBLICATIONS

International Search Report for PCT/EP2023/067920 dated Nov. 9, 2023, 4 pages.
(Continued)

*Primary Examiner* — Edna Wong
(74) *Attorney, Agent, or Firm* — Armstrong Teasdale LLP

(57) ABSTRACT

Described herein is a method of using a polyaminoamide including a group of formula N1

$$[B—A—B'—Z]_n[Y—Z]_m \qquad (N1)$$

in a composition for electrodepositing nanotwinned copper, that is obtained by reacting a diamine compound including two primary or secondary amino groups with an aminoacid in a molar ratio of approx. 1:2 to form an aminoamide
(Continued)

compound that is afterwards reacted with a coupling agent and optionally with a diamine or other co-monomers.

17 Claims, 5 Drawing Sheets

(58) Field of Classification Search
USPC .......................................................... 205/296
See application file for complete search history.

(56) References Cited

U.S. PATENT DOCUMENTS

| | | | |
|---|---|---|---|
| 6,425,996 B1 | 7/2002 | Dahms et al. | |
| 10,566,314 B2 | 2/2020 | Yang | |
| 2013/0122326 A1 | 5/2013 | Chen et al. | |
| 2013/0270121 A1 | 10/2013 | Liao et al. | |
| 2016/0076160 A1 | 3/2016 | Whitten et al. | |
| 2020/0185224 A1* | 6/2020 | Kienle ..................... | C25D 3/38 |

FOREIGN PATENT DOCUMENTS

| | | |
|---|---|---|
| WO | 2011064154 A2 | 6/2011 |
| WO | 2012164509 A1 | 12/2012 |
| WO | 2020092244 A1 | 5/2020 |
| WO | 2021197950 A1 | 10/2021 |
| WO | 2021236398 A1 | 11/2021 |
| WO | 2022047480 A1 | 3/2022 |
| WO | 2023052254 A1 | 4/2023 |

OTHER PUBLICATIONS

Written Opinion for PCT/EP2023/067920 dated Nov. 9, 2023, 7 pages.
Chen et al., "Electrodeposition and Growth Mechanism of Nanotwinned Copper in High Aspect-Ratio via Structures", Journal of the Electrochemical Society, vol. 168, 102503, 5 pages (2021).
Zhan et al., "Preparation of highly (111) textured nanotwinned copper by medium-frequency pulsed electrodeposition in an additive-free electrolyte", Electrochimica Acta, vol. 365, 137391, 12 pages (2021).

* cited by examiner

USE OF A COMPOSITION COMPRISING A POLYAMINOAMIDE TYPE COMPOUND FOR COPPER NANOTWIN ELECTRODEPOSITION

CROSS-REFERENCE TO RELATED APPLICATIONS

This application is a U.S. National Phase Application of International Patent Application No. PCT/EP23/67920, filed Jun. 29, 2023, which claims priority to European Patent Application No. 22183676.0, filed Jul. 7, 2022, and European Patent Application No. 23167077.9, filed Apr. 6, 2023, each of which are hereby incorporated by reference herein.

BACKGROUND OF THE INVENTION

The invention relates to a new use of a copper electroplating composition comprising a polyaminoamide type additive and a process for copper electrodeposition.

Copper lines are formed by electroplating the metal into very thin, high-aspect-ratio trenches and vias in a methodology commonly referred to as “damascene” processing (pre-passivation metallization).

With the advancement of microelectronics, there is a continual need to create smaller and denser interconnect features. One method towards this goal is the removal of solder between two separate substrates that connect copper vias, pads, bumps, or pillars, which can be accomplished, for example, by process called Cu—Cu hybrid bonding.

Due to the combination of excellent mechanical properties, good conductivity, and unique structure, nanotwinned copper has drawn attention for use in microelectronics. Nanotwinned copper (nt-Cu) exhibits excellent mechanical and electrical properties and may be used in a wide variety of applications in wafer-level packaging and advanced packaging designs. Nanotwinned copper represents ultrafine-grain copper whose grains contain a high density of layered nanoscopic twins divided by coherent twin boundaries.

Nanotwinned copper can be achieved in several ways, including, for example, sputtering and electrolytic deposition. Direct current electrolytic plating is very compatible with industrial mass production. Twinning may occur in a material where two parts of a crystal structure are symmetrically related to one another. In a face-centered cubic (FCC) crystal structure, of which copper is included, coherent twin boundaries may be formed as (111) mirror planes from which the typical stacking sequence of (111) planes is reversed. In other words, adjacent grains are mirrored across coherent twin boundaries in a layered (111)-structure. Twins grow in a layer-by-layer manner extending along a lateral (111) crystal plane where a twin thickness is on the order of nanometers, hence the name “nanotwins”.

Compared to copper having conventional grain boundaries, nanotwinned copper possesses strong mechanical properties, including high strength and high tensile ductility. Nanotwinned copper also demonstrates high electrical conductivity, which may be attributable to the twin boundary, causing electron scattering that is less significant compared to a grain boundary. Furthermore, nanotwinned copper exhibits high thermal stability, which may be attributable to the twin boundary having excess energy on the order of magnitude lower than that of a grain boundary. In addition, nanotwinned copper enables high copper atom diffusivity, which is useful for copper-to-copper direct bonding. Nanotwinned copper also shows high resistance to electromigration, which may be a result of twin boundaries slowing down electromigration-induced atomic diffusion. Nanotwinned copper demonstrates a strong resistance to seed etch that may be important in fine-line redistribution layer applications. Nanotwinned copper also shows low impurity incorporation, which results in fewer Kirkendall voids as a result of soldered reactions with the nanotwinned copper. In some implementations, nanotwinned copper enables direct copper-copper bonding. Such copper-copper bonding may occur at low temperatures, moderate pressures, and lower bonding forces/times. Typically, the deposition of copper structures results in rough surfaces. In some implementations, prior to copper-copper bonding, electrodeposition of nanotwinned copper may be followed by an electropolishing process to achieve smooth surfaces. With the smooth surfaces, the nanotwinned copper structure may be used in copper-copper bonding with shorter bonding times, lower temperatures, and fewer voids.

WO2020/092244 and US 2013/0270121 A1 describe a copper structure having a high density of nanotwinned copper deposited on a substrate. It does not describe the particular electrolytic copper plating bath but instead describes electroplating conditions like pulse current, low temperatures, and the like.

U.S. Pat. No. 10,566,314 describes how the optimal copper grain structure for Cu—Cu metal to metal bonding is columnar grain microstructure. The copper grain microstructure plated by the disclosed suppressor-only system produces a columnar grain structure as a result of plating nanotwinned copper.

US 2013/0122326 A1 discloses electrodeposited nano-twins copper layer and a method of fabricating the same. At least 50% in volume of the electrodeposited nano-twins copper layer comprises plural grains adjacent to each other, wherein the said grains are made of stacked twins, the angle of the stacking directions of the nano-twins between one grain and the neighboring grain is between 0 to 20 degrees. A plating solution comprises copper sulfate, chloride anion and methyl sulfonate, and other surfactant or lattice modification agent (such as BASF Lugalvan) can be added.

WO 2021/197950 discloses a copper electroplating composition comprising a polyaminoamide type leveling agent preparable from a diamine comprising a tertiary and a primary or secondary amino group, a diacid and a coupling agent.

WO 2023/052254 discloses a composition comprising copper ions, an acid, and at least one polyaminoamide comprising, a group of formula $[B\text{-}A\text{-}B'\text{-}Z]_n[Y\text{-}Z]_m$ and its use for depositing copper bumps or RDL structures.

WO 2022/47480 A1 discloses an electroplating solution used to deposit copper having a high density of nanotwinned columnar copper grains, the solution comprising a copper salt, a source of halide ions, and a linear or branched polyhydroxyl, e.g. a reaction product between 2,3-epoxy-1-propanol and aminic alcohol or ammonium alcohol.

For alkaline zink or zink alloy, e.g. ZnFeCo alloy, electrodeposition compositions specific cationic polymers are used to enhance brightness and alloy components uniformity. One of these cationic polymers e.g. disclosed in U.S. Pat. No. 5,435,898 is MIRAPOL AD-1 of formula

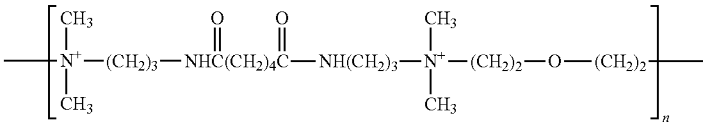

2n Cl⁻

However, there remains a need in the art for an improved electrolytic copper composition for producing nanotwinned copper deposits. In addition, there remains a need in the art for an improved electrolytic copper composition that can deposit nanotwinned copper in (111) orientation and with a high amount of nanotwinning.

It is an object of the present invention to provide an acidic copper electroplating composition that provides copper deposits with nanotwinned copper in (111) orientation and with a high amount of nanotwinning.

SUMMARY OF THE INVENTION

Surprisingly, it has now been found, that the use of particular cationic aminoamide polymers is capable of forming nanotwinned copper, particularly nanotwinned copper in (111) orientation, with a high amount of nanotwinning.

Therefore, the present invention provides a new use of a polyaminoamide comprising a group of formula N1

$$[B—A—B'—Z]_n[Y—Z]_m \quad \text{(N1)}$$

in a composition for electrodepositing nanotwinned copper, wherein

B, B' are the same or different, preferably the same, and are aminoacid fragments of formula N2a (N2a)

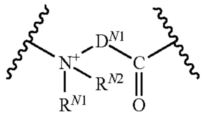

or of Formula N2b (N2b)

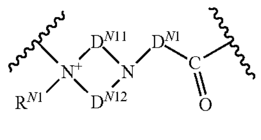

or of Formula N2c (N2c)

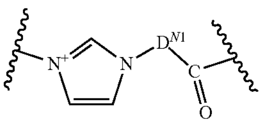

A is a diamine fragment independently selected from formula N3a (N3a)

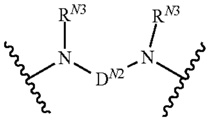

or of Formula N3b (N3b)

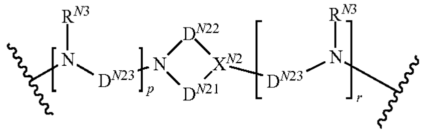

$D^{N1}$ is selected from a divalent group selected from (a) a $C_1$-$C_{20}$-alkanediyl which may optionally be substituted by an amino group or interrupted by a double bond or an imino group, (b) an ether or polyether group of formula N2c $$—(D^{N10}—O—]_oD^{N10}— \quad \text{(N2c)}$$

$D^{N2}$ is a divalent group selected from (a) a linear, branched or cyclic $C_1$ to $C_{20}$ alkanediyl, which may optionally be interrupted by one ore more $NR^{N10}$, or substituted by one or more, preferably 1 or 2, groups $NR^{N10}R^{N11}$ or $OR^{N10}$, or (b) -$D^{N13}$-$Ar^{N13}$-$D^{N13}$-; or (c) an ether or polyether group of formula N2c $D^{N10}$ is selected from a linear or branched $C_1$-$C_6$-alkanediyl, preferably ethanediyl or propanediyl;

$D^{N13}$ is selected from a $C_1$-$C_6$-alkanediyl, preferably from methanediyl and ethanediyl;

$Ar^{N13}$ is a $C_6$ to $C_{10}$ aromatic moiety, preferably p-phenylene;

$D^{N11}$,$D^{N12}$ are (a) independently selected from a linear or branched $C_1$ to $C_6$ alkanediyl, or (b) both, together with the adjacent two N atoms, part of a 5 or 6-membered aromatic heterocyclic ring system;

$D^{N21}$,$D^{N22}$ are (a) independently selected from a linear or branched $C_1$ to $C_6$ alkanediyl, or (b) both, together with the adjacent two N atoms, part of a 5 or 6-membered aromatic heterocyclic ring system;

$D^{N23}$ is a $C_1$ to $C_6$ alkanediyl;

$R^{N1}$, $R^{N2}$ are independently selected from a $C_1$ to $C_6$ alkyl;

$R^{N3}$ is selected form H and a $C_1$ to $C_6$ alkyl;

$R^{N10}$, $R^{N11}$ are independently selected from H or a linear or branched $C_1$ to $C_6$ alkanediyl;

$X^{N2}$ is N or $CR^{N3}$;

Y is a diamine comonomer fragment;

Z is a divalent coupling fragment of formula N4

(N4)

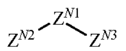

$Z^{N1}$ is selected from (a) a linear or branched $C_1$ to $C_{12}$ alkanediyl, which may be interrupted by one or more O atoms, preferably a $C_1$ to Ce alkanediyl, which may be interrupted by 1 or two O atoms, or (b) a divalent group $-D^{N11}-Ar^{N11}-D^{N11}-$;

$Z^{N2}$, $Z^{N3}$ are independently selected from a chemical bond and hydroxyethanediyl;

n is an integer of from 1 to 400;

m is 0 or an integer of from 1 to 400;

o is an integer of from 1 to 6; and p, r are independently 0 or 1;

wherein the ratio of n:m is at least 25:75.

The nanotwin promotors according to the present invention are particularly useful for depositing nanotwinned copper in (111) orientation with a high amount of nanotwinning. Furthermore, by using the allow the filling recessed features on the micrometer scale without substantially forming defects, such as but not limited to voids. The nanotwin promotors provide a copper electroplating bath that provides a uniform and planar copper deposit, in particular in recessed features.

Furthermore, the nanotwin promotors lead to reduced impurities, such as but not limited to organics, chloride, sulfur, nitrogen, or other elements. Especially, when solder is directly plated on copper higher organic impurity levels lead to pronounced Kirkendall voiding. These voids lower the reliability of the solder stack and is therefore less preferred. The additives described herein additionally facilitate high plating rates and allows plating at elevated temperature.

The invention further relates to a composition comprising copper ions, an acid, and at least one polyaminoamide comprising a group of formula N1, the composition being devoid of any sulfur-containing compounds and any polyalkylene oxide compounds.

The invention further relates to a process for electrodepositing copper on a substrate comprising a recessed feature comprising a conductive feature bottom and a dielectric feature side wall, the process comprising:

a) contacting a composition comprising a polyaminoamide as described herein, and b) applying a current to the substrate for a time sufficient to deposit nanotwinned copper on the substrate.

DETAILED DESCRIPTION OF THE INVENTION

Figure 1A:
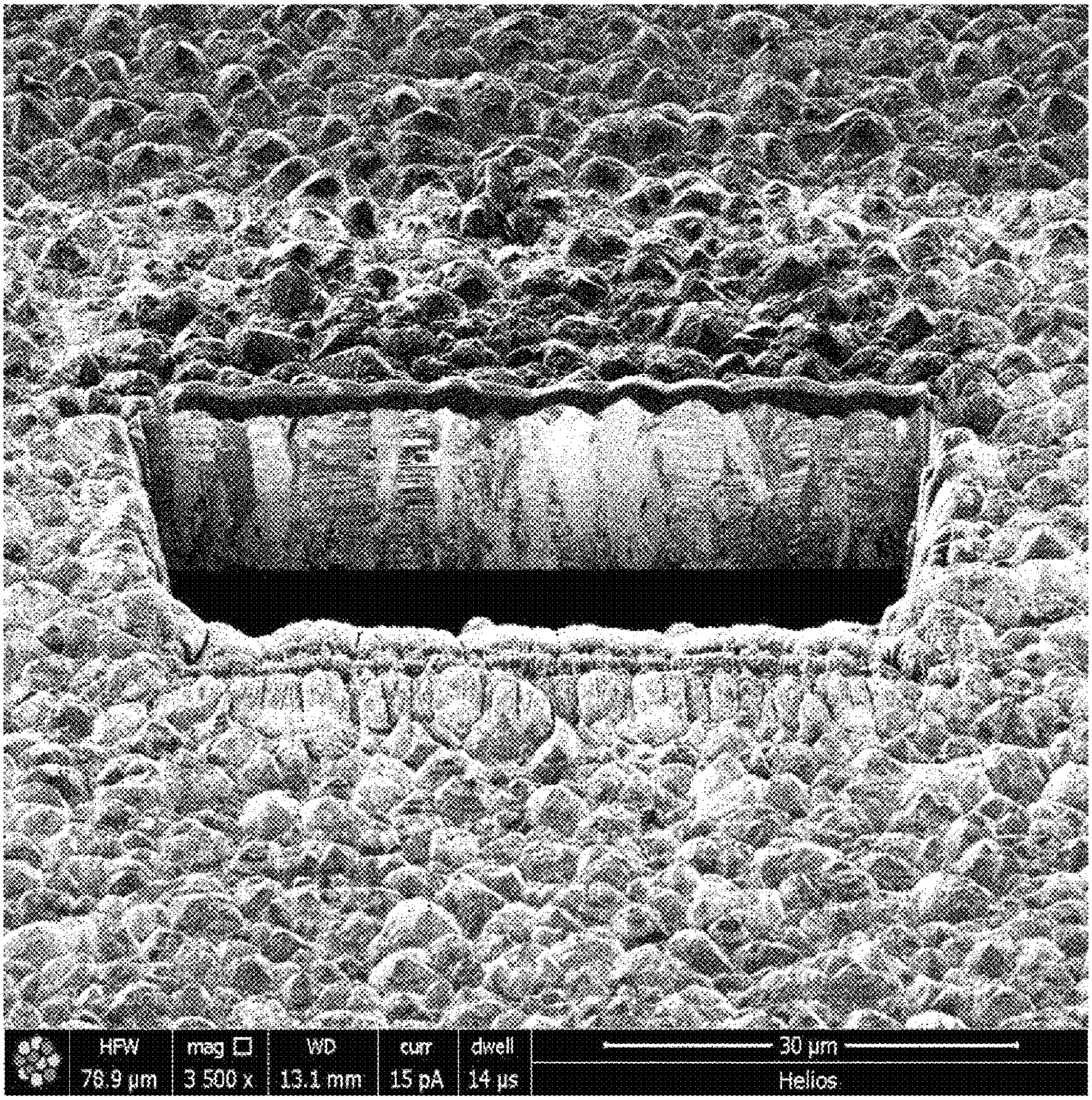
FIG. 1*a* shows an overview FIB-SAM picture of a nanotwinned copper layer electrodeposited using a composition according to example 2.1.

It has been surprisingly found, that quaternized coupled aminoamide polymers may advantageously be used as nanotwin promotors in the copper electrodeposition, i.e. it helps to deposit copper having a columnar (111) orientation. The quaternized coupled aminoamide polymers lead to a high amount of nanotwins in the deposited copper layers. The quaternized coupled aminoamide polymers are also referred to herein as "cationic aminoamide polymers", "coupled aminoamide polymers", "coupled polyaminoamide", or "nanotwin promotor".

As used herein, "accelerator" refers to an organic additive that increases the plating rate of the electroplating bath. The terms "accelerator" and "accelerating agent" are used interchangeably throughout this specification. In literature, sometimes the accelerator component is also named "brightener" or "brightening agent". "Suppressing agent" or "suppressor" refers to an organic compound that decreases the plating rate of the electroplating bath and ensures that the recessed features are voidless filled from the bottom to the top (so called "bottom-up filling"). The terms "suppressors" and "suppressing agents" are used interchangeably throughout this specification. "Leveler" refers to an organic compound that is capable of providing a substantially planar metal deposit over areas with a higher or lower number of recessed features, or different areas across a wafer or die. The terms "leveler", "leveling agent" and "leveling additive" are used interchangeably throughout this specification.

"Aperture size" according to the present invention means the smallest diameter or free distance of a recessed feature before plating. The terms "width", "diameter", "aperture" and "opening" are used herein, depending on the geometry of the feature (trench, via, etc.) synonymously. As used herein, "aspect ratio" means the ratio of the depth to the aperture size of the recessed feature.

As used herein, "chemical bond" means that the respective moiety is not present but that the adjacent moieties are bridged so as to form a direct chemical bond between these adjacent moieties. By way of example, if in a molecule A-B-C the moiety B is a chemical bond then the adjacent moieties A and C together form a group A-C.

The term "$C_x$" means that the respective group comprises x numbers of C atoms. The term "$C_x$ to $C_y$ alkyl" means alkyl with a number x to y of carbon atoms and, unless explicitly specified, includes unsubstituted linear, branched and cyclic alkyl. As used herein, "alkanediyl" refers to a diradical of linear, branched or cyclic alkanes or a combination thereof.

As used herein, "aromatic rings" cover aryl and heteroaryl groups.

As used herein, a "high amount of nanotwinning" or "high amount of nanotwins" refers to copper structures having greater than about 80% nanotwinning, and even greater than about 90% nanotwinning as observed using suitable microscopy techniques.

Nanotwin Promotor

Besides copper ions and an acid, the metal electroplating composition comprises at least one nanotwin promotor in form of a cationic polyaminoamide of formula I:

$$[B—A—B'—Z]_n[Y—Z]_m \quad \text{(N1)}$$

The additive according to Formula N1 is generally obtainable by first reacting a diamine compound ('a') comprising two a primary or secondary amino groups with an aminoacid 'b' in a molar ratio of approx. 1:2 to form an aminoamide compound b-A-b'. In contrast to the compounds disclosed in U.S. Pat. No. 6,425,996 B1, discrete monomeric compounds are received in this intermediate product. aminopropyl Afterwards this monomeric aminoamide intermediate compound is reacted with a coupling agent 'z' to connect several aminoamide compounds with each other to form the coupled aminoamide $[A-B-A'-Z]_n$ according to the invention.

By way of example, this reaction scheme illustrates the nanotwin promotor preparation by starting from propane-1,3-diamine, N,N-dimethylglycine and epichlorohydrine:

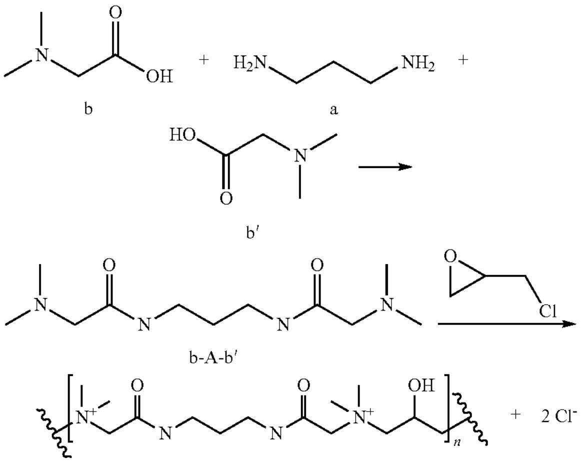

b a b′ b-A-b′

$[B-A-B'-Z]_n$

In a first step discrete aminoamide monomers b-A-b' are prepared, which are then coupled together with the coupling agent z. In this case m is 0.

It is also possible to co-couple further comonomers Y comprising at least two amino groups with the aminoamide compound. In this case m is equal to or greater than 1. The diamine comonomer may comprise tertiary, secondary or primary amino groups, two tertiary amino groups are preferred. The advantage of using a comonomer is to achieve a higher molecular weight of the nanotwin promotor. In this context, "comonomer" means any compound that may form a copolymer with the compound $[A-B-A'-Z]_n$; comonomers may be monomeric as well as polymeric compounds.

The fragments A, B, B', Z and Y are described in the following in more detail.

In a first embodiment the aminoacid compounds b and 'b' form two aminoacid fragments B and B' of formula N2a (N2a)

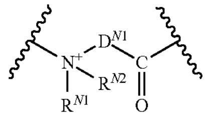

In formula N2a the aminoacid spacer $D^{N1}$ is selected from a divalent group selected from (a) a $C_1$-$C_{20}$-alkanediyl which may optionally be substituted by an amino group or interrupted by a double bond or an imino group, or (b) an ether or polyether group of formula N2a $$—(D^{N10}—O—]_oD^{N10}—; \quad \text{(N2c)}$$

wherein $D^{N10}$ is selected from a $C_1$-$C_6$-alkanediyl, preferably a $C_1$-$C_4$-alkanediyl, most preferably ethanediyl or propanediyl and o is an integer of from 1 to 100, preferably of from 1 to 20, most preferably from 1 to 15. In a particular embodiment o is from 3 to 10, in another embodiment o is from 10 to 20.

In a preferred embodiment $D^{N1}$ is selected from (i) a linear $C_2$ to $C_{10}$ alkanediyl group, which may be unsubstituted or substituted by an amino group, (ii) a $C_2$ to $C_3$ oxyalkylene group, (iii) a cyclic $C_6$ to $C_{12}$ alkanediyl group, or (iv) a divalent phenyl or pyridyl group.

In another preferred embodiment $D^{N1}$ is selected from ethanediyl, propanediyl, butanediyl, pentanediyl, hexanediyl, heptanediyl, octanediyl, nonanediyl, or decanediyl, which may be unsubstituted or substituted by an amino group. Most preferably $D^{N1}$ is selected from ethane-1,2-diyl, propane-1,3-diyl, butane-1,4-diyl, pentane-1,5-diyl, 5-aminopentane-1,5-diyl, and hexane-1,6-diyl.

In formula N2a, $R^{N1}$ and $R^{N2}$ are independently selected from a $C_1$ to $C_6$ alkyl, preferably methyl, ethyl or propyl. $R^{N3}$ is selected form H and a $C_1$ to $C_6$ alkyl, preferably from H and methyl.

In another embodiment the aminoacid compounds b and 'b' form two aminoacid fragments B and B' of formula N2b (N2b)

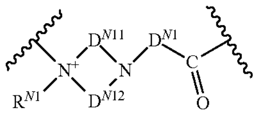

In formula N2b the divalent groups $D^{N11}$ and $D^{N12}$ are independently selected from a linear or branched $C_1$ to $C_6$ alkanediyl. $D^{N1}$ may be same as defined for formula N2a above. $R^{N1}$ is selected from a $C_1$ to $C_6$ alkyl, preferably methyl, ethyl and propyl.

In a first preferred embodiment of formula N2b $D^{N11}$ and $D^{N12}$ are independently selected from a linear or branched $C_1$ to $C_4$ alkanediyl. Even more preferably $D^{N11}$ and $D^{N12}$ are selected from $(CH_2)_g$, wherein g is an integer from 1 to 6, preferably 1 to 3. Most preferably $D^{N11}$ and $D^{N12}$ are both ethanediyl, or $D^{N11}$ is methanediyl and $D^{N12}$ is propanediyl.

In another preferred embodiment of formula N2b $D^{N11}$ and $D^{N12}$, together with the two adjacent N atoms, form an imidazole ring.

In another embodiment the aminoacid compounds b and 'b' form two aromatic heterocyclic aminoacid fragments B and B' of formula N2c (N2c)

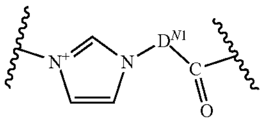

In formula N2b $D^{N1}$ may be same as defined for formula N2a above.

Without limitation, tertiary aminoacids that are particularly useful for the preparation of the nanotwin promotors according to the invention are N,N-dimethylglycine, 3-(Dimethylamino)propanoic acid, 4-(Dimethylamino)butanoic acid, 5-(dimethyl-amino)pentanoic acid, 1H-imidazole-1-acetic acid, 1H-imidazole-1-propanoic acid, 1H-imidazole-1-butanoic acid, and an aminoacid of formula N2d (N2d)

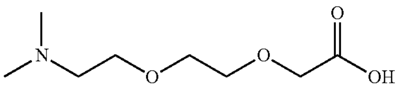

The aminoacids may be used in the form of the free acids or as carboxylic acid derivatives, such as anhydrides, esters, amides or acid halides, in particular chlorides. Preference is given to using the free amino acids.

Since the aminoacid fragments B and B' are positively charged, counterion $Y^{y-}$ are required to neutralize the whole composition, wherein y is a positive integer. Preferably such counter ions may be selected from halide, particularly chloride, methane sulfonate, sulfate or acetate.

The diamine compound 'a' forms a diamine fragment A of formula N3a (N3a)

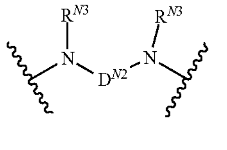

or of Formula N3b (N3b)

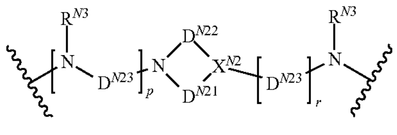

Herein the primary or secondary amine functional groups of both amine compounds are bound to the carbonyl functionality of the aminoacid fragment, respectively.

In a first embodiment of formula N3a the divalent group $D^{N2}$ is selected from a linear or branched $C_1$ to $C_{20}$ alkanediyl, which may optionally be interrupted by one or more $NR^{N10}$ or S, or substituted by one or more, preferably 1 or 2 groups $NR^{N10}R^{N11}$ or $OR^{N10}$, wherein $R^{N10}$, $R^{N11}$ are independently selected from H and $C_1$-$C_{10}$ alkyl, more preferably from H and $C_1$-$C_4$ alkyl, most preferably from H, methyl or ethyl. In a particularly preferred embodiment $D^{N2}$ is selected from a linear or branched $C_1$ to $C_6$ alkanediyl. Even more preferably $D^{N2}$ is selected from $(CH_2)_g$, wherein g is an integer from 1 to 6, preferably 1 to 3. Most preferably $D^{N2}$ is 1,2-ethanediyl or 1,3-propanediyl.

In a second embodiment of formula N3a the divalent group $D^{N2}$ is selected from -$D^{N11}$-$Ar^{N13}$-$D^{N13}$ wherein $D^{N13}$ is selected from a $C_1$-$C_6$-alkanediyl, preferably methanediyl or ethanediyl, and $Ar^{N13}$ is a $C_6$ to $C_{10}$ aromatic moiety, preferably phenylene, most preferably p-phenylene.

In a third embodiment of formula N3a the divalent group $D^{N2}$ is selected from an ether or polyether group of formula N2a $$—(D^{N10}—O—]_o D^{N10}— ; \qquad \text{(N2a)}$$

wherein $D^{N10}$ is selected from a $C_1$-$C_6$-alkanediyl, preferably a $C_1$-$C_4$-alkanediyl, most preferably ethanediyl or propanediyl and o is an integer from 1 to 100, preferably from 1 to 50, most preferably from 1 to 15. In a particular embodiment o is an integer from 3 to 10, in another embodiment o is an integer from 10 to 40.

In formula N3b the divalent groups $D^{N21}$ and $D^{N22}$ are (a) independently selected from a linear or branched $C_1$ to $C_6$ alkanediyl, preferably methanediyl, ethanediyl or propanediyl, or (b) $D^{N21}$ and $D^{N22}$ are both, together with the adjacent two N atoms, part of a 5 or 6-membered aromatic heterocyclic ring system. $D^{N23}$ may be a $C_1$ to $C_6$ alkanediyl, preferably methanediyl, ethandiyl, propanediyl or butanediyl, most preferably methanediyl, ethandiyl, or propanediyl. $R^{N3}$ may be selected form H and a $C_1$ to $C_6$ alkyl, preferably H or methyl, most preferably H. $X^{N2}$ may be N or $CR^{N3}$, preferably N, C—H or C—$CH_3$; p and r may be the same or different and be 0 or 1. If p or r is 1, the respective aminoacid is connected to a primary or secondary amine functional group; if p or r is 0, the respective aminoacid is connected to the secondary amine functional group that is part of the ring system.

In a first preferred embodiment of formula N3b $D^{N21}$ and $D^{N22}$ are independently selected from a linear or branched $C_1$ to $C_4$ alkanediyl. Even more preferably $D^{N21}$ and $D^{N22}$ are selected from $(CH_2)_g$, wherein g is an integer from 1 to 6, preferably 1 to 3. Most preferably $D^{N21}$ and $D^{N22}$ are both ethanediyl, or $D^{N21}$ is methanediyl and $D^{N22}$ is propanediyl.

In a second preferred embodiment of formula N3b $D^{N21}$ and $D^{N22}$, together with the two adjacent N atoms, form an imidazole ring.

Diamines that are particularly useful for the preparation of the nanotwin promotors are propylenediamine, 1,3-diaminopropane, 1,4-diaminobutane, 1,6-diaminohexane, 1,8-diaminooctane, 1,12-diaminododecane, diaminodicyclohexylmethane, isophorondiamine, 3,3'-dimethyl-4,4'-diaminodicyclo-hexyl-methane, 4,7,10-trioxatridecane-1,13-diamine, Xylenediamine, Poly(propylene glycol) bis(2-aminopropyl ether with an average degree of polymerization of from 1 to 50, preferably 2 to 40, most preferably 1 to 10, and lysine.

As used herein, "average degree of polymerization" means the average number of repeating monomeric units in the polymer.

The coupling agent 'z' forms the coupling fragment Z of formula N4

(N4)

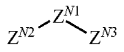

wherein $Z^{N1}$ is selected from (a) a linear or branched $C_1$ to $C_{12}$ alkanediyl, which may be interrupted by one or more O atoms, preferably a $C_1$ to $C_6$ alkanediyl, which may be interrupted by 1 or two O atoms; or (b) a divalent group $-D^{N11}-Ar^{N11}-D^{N11}-$;

$Z^{N2}$, $Z^{N3}$ are independently selected from a chemical bond or hydroxyethanediyl.

In a first preferred embodiment $Z^{N1}$ is selected from a $C_1$ to $C_{12}$ alkanediyl, preferably a $C_1$ to $C_4$ alkanediyl, most preferably methanediyl or ethanediyl. In a second preferred embodiment $Z^{N1}$ is selected from an alkylether or polyalkylether group of formula $-(D^{N10}-O-]_oD^{N10}-$, particularly a bis(2-ethanediyl)ether group, wherein $D^{N10}$ is selected from a $C_1$-$C_6$-alkanediyl, preferably a $C_1$-$C_4$-alkanediyl, most preferably ethanediyl or propanediyl and o is an integer of from 1 to 100, preferably of from 1 to 20, most preferably from 1 to 10. In a particular embodiment o is from 1 to 5, in another embodiment o is from 5 to 15. In a third preferred embodiment $Z^{N1}$ is selected from a divalent group $-D^{N11}-Ar^{N11}-D^{N11}-$, particularly a biphenyl group, wherein $D^{N11}$ is selected from a $C_1$-$C_6$-alkanediyl, preferably methanediyl and ethanediyl, and $Ar^{N11}$ is a $C_6$ to $C_{12}$ aromatic moiety, preferably phenylene or biphenylene.

In another preferred embodiment $Z^{N2}$ is selected from a chemical bond and $Z^{N3}$ is selected from hydroxyethanediyl. In yet another preferred embodiment both $Z^{N2}$ and $Z^{N3}$ are selected from a chemical bond.

Such coupling fragments Z are received from coupling agents comprising a leaving group such as but not limited to halogen, particularly Cl or Br, and/or an epoxy group.

Particularly preferred coupling agents 'z' are selected from bis(2-chloroethyl)ether; bis(2-chloro-ethoxy)ethane; epichlorohydrine, 1,ω-dihalo($C_2$-$C_{10}$) alkanes, such as but not limited to 1,3-dichloro propane, 1,4-dichloro butane, 1,5-dichloro pentane, and 1,6-dichlorohexane; bis(2-chloroethyl)ether, di(haloalkyl)aryl groups such as but not limited to xylylene dichloride and 4,4'-bis(bromomethyl)biphenyl. Herein chloride or bromide may be exchanged by other leaving groups, such as but not limited to triflate, tosylate, mesylate.

In formula N1 n may be an integer of from 1 to 400, preferably of from 2 to 200, more preferably from 2 to 150. In a particular embodiment n may be an integer from 2 to 50, in another embodiment n is 50 to 150.

In formula N1 m is 0 or, if a co-monomer is present, an integer from 1 to 400, preferably of from 1 to 200, more preferably from 2 to 150.

If a comonomer is used, the ratio of n to m should be sufficiently high to ensure a nanotwin formation. If n is too low, insufficient amounts of nanotwins are formed. If n is too high, the molecular mass increasing effect of the comonomer is low. Therefore, the ratio of n to m may be of from 25:75 to 99.5:0.5, preferably from 30:70 to 90:10 or from 40:60 to 96:4, even more preferably from 30:70 to 70:30, even more preferably from 50:50 to 99.5:0.5, even more preferably of from 50:50 to 99:1, even more preferably of from 60:40 to 99.5:0.5, even more preferably of from 70:30 to 99.5:0.5, most preferably of from 80:20 to 99.5:0.5.

Generally, the mass average molecular weight $M_w$ of the nanotwin promotor may be from about 450 to about 150 000 g/mol, preferably from about 1 000 to about 80 000 g/mol, most preferably from about 1 000 to about 50 000 g/mol.

A first preferred embodiment of the nanotwin promotor is a coupled aminoamide of formula N5

(N5)

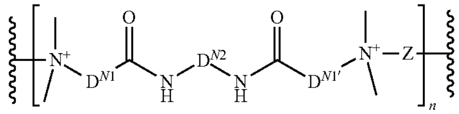

with the general definitions provided above. Preferably $D^{N1}$ and $D^{N2}$ are independently selected from methanediyl, ethane-1,2-diyl, propane-1,2-diyl, propane-1,3-diyl, butane-1,2-diyl, butane-1,3-diyl, butane-1,4-diyl, pentane-1,5-diyl, hexane-1,6-diyl. In another embodiment, cyclic alkanediyl groups $D^{N2}$ such as but not limited to

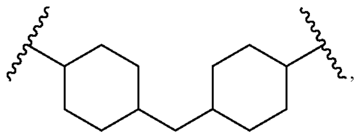,

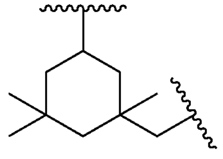 or

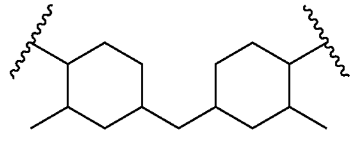

may be used. Besides diamines, triamines, tetramines or other polyamines may be used.

A second preferred embodiment of the nanotwin promotor are cyclic coupled aminoamide of formula N6a or N6b (N6a)

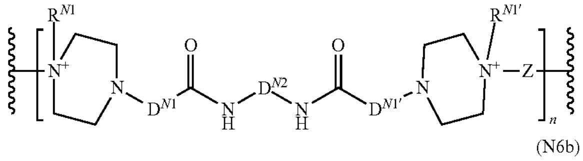

(N6b)

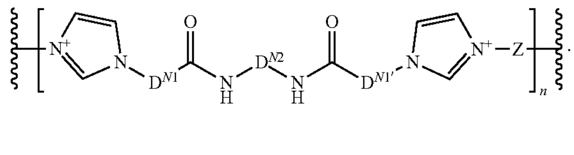.

with the general definitions provided above. Preferably $D^{N1}$ and $D^{N2}$ are independently selected from metanediyl, ethane-1,2-diyl, propane-1,2-diyl, propane-1,3-diyl, butane1,2-diyl, butane1,3-diyl, and butane-1,4-diyl.

A third preferred embodiment of the nanotwin promotor is a coupled aminoamide of formula N7

(N7)

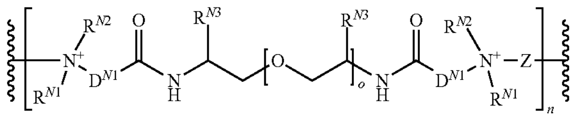

with the general definitions provided above. Preferably $D^{N1}$ is selected from methandiyl, ethanediyl, propanediyl, butanediyl, pentanediyl, hexanediyl, heptanediyl, octanediyl, nonanediyl and decanediyl; $R^{N3}$ is selected from H, methyl, ethyl and propyl; and o is an integer from 2 to 50, preferably 2 to 40.

A fourth preferred embodiment of the nanotwin promotor is a coupled aminoamide of formula N8

(N8)

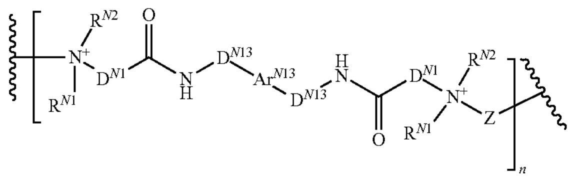

with the general definitions provided above. Preferably $Ar^{N13}$ is phenylene, particularly phenyl-1,4-diyl; $D^{N13}$ and $D^{N1}$ are independently selected from methanediyl, ethanediyl, propanediyl, and butanediyl.

A fifth preferred embodiment of a nanotwin promotor according to the present invention is a coupled aminoamide of formula N9

(N9)

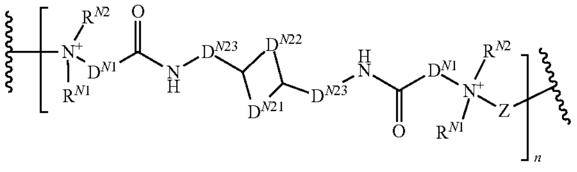

with the general definitions provided above. Preferably $D^{N1}$ and $D^{N23}$ are independently selected from methanediyl, ethanediyl, propanediyl and butanediyl; $D^{N21}$ and $D^{N22}$ are independently selected from methandiyl, ethandiyl and propanediyl; $R^{N1}$ and $R^{N2}$ are independently selected from methyl, ethyl, propyl, and butyl.

The aminoamide polymers described herein are usually terminated by tertiary amine groups or the partly reacted coupling agents 'z'.

Particularly preferred polyaminoamide-type nanotwin promotors are:

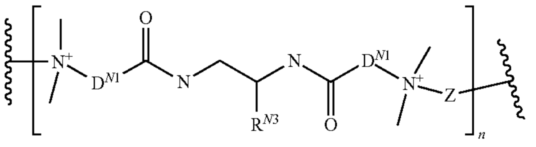

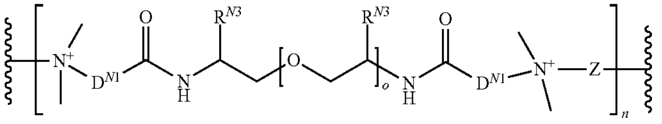

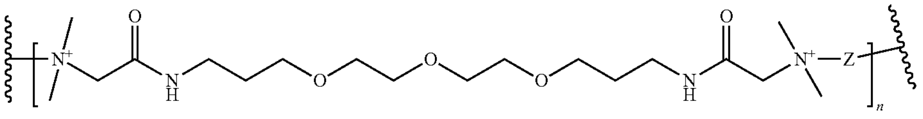

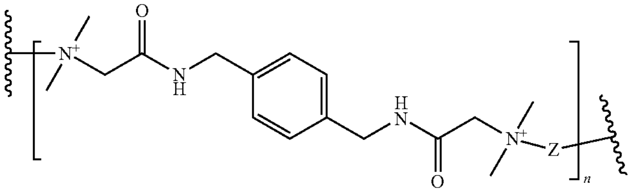

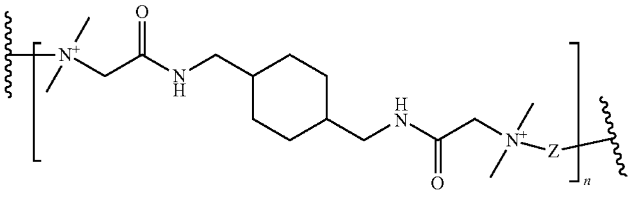

-continued

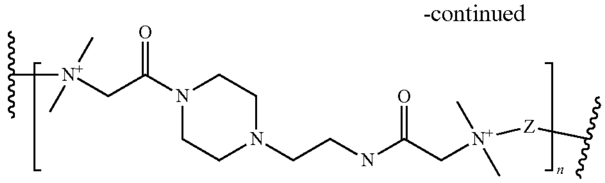

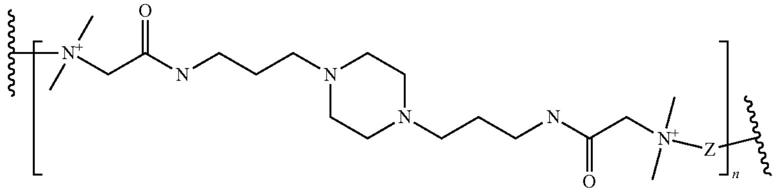

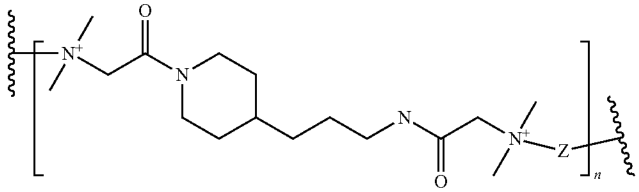

and

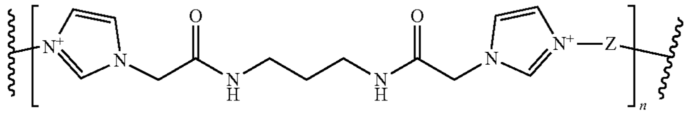

In an alternative embodiment of formula N1 m is equal to or greater than 1 and Y is an amine co-monomer fragment received when an amine co-monomer ‘y’ comprising at least two tertiary or secondary amino groups is co-coupled together with the aminoamide compound. This co-coupling may be performed in mixture or in sequence in any order. Preferred is a co-coupling from a mixture comprising the aminoamide and the amine co-monomer.

In the following, copolymeric nanotwin promotors with m≥1 are describe in more detail.

In the simplest case, Y may be a fragment of formula N3a or formula N3b. In this case Y may be the same or different from A and A'.

In another embodiment, Y may be other fragments disclosed on page 6 of US 2016/0076160 A1 (independent of its counter ion $Cl^-$), which are incorporated herein by reference.

In yet another embodiment, Y may be a fragment of formula M2

(M2)

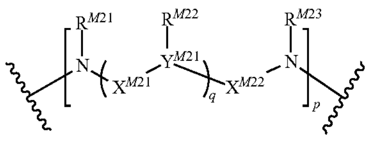

wherein $Y^{M21}$ is, for each repeating unit 1 to q independently, selected from nitrogen, an amide group or an urea group;

$X^{M21}$, $X^{M22}$ are independently selected from $C_2$ to $C_6$ alkanediyl, preferably ethanediyl, propanediyl or butanediyl;

$R^{M21}$, $R^{M23}$ are independently selected from H and $C_1$ to $C_6$ alkyl, preferably methyl, ethyl, propyl or butyl;

$R^{M22}$ is a $C_1$ to $C_6$ alkyl, preferably methyl or ethyl;

p is an integer from 1 to 100, preferably from 3 to 50, most preferably from 5 to 30;

q is an integer from 0 to 5.

In a preferred embodiment Y may be a diamine fragment of formula M3a, M3b or M3c (M3a)

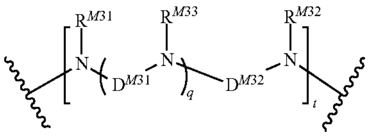

(M3b)

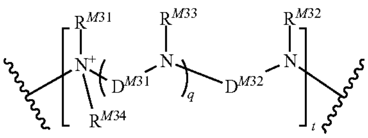

(M3c)

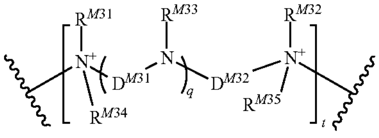

wherein $R^{M31}$, $R^{M32}$, $R^{M3}$, $R^{M34}$, and $R^{M31}$ are independently selected from H and $C_1$ to $C_6$ alkyl or two of adjacent groups $R^{M31}$, $R^{M32}$, $R^{M33}$, $R^{M34}$ or $R^{M31}$ together form a $C_1$ to $C_3$ alkanediyl group;

$D^{M31}$ and $D^{M32}$ are independently a $C_2$ to $C_6$ alkyl, preferably ethandyl, propanediyl or butanediyl, most preferably ethanediyl or propanediol;

t is an integer from 1 to 100, preferably from 3 to 50, more preferably from 5 to 30.

In another preferred embodiment Y may also be a polyaminoamide fragment of formula M1

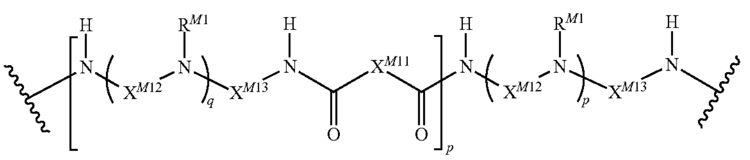

(M1)

wherein $X^{M11}$ is, for each repeating unit 1 to p independently, selected from a chemical bond or a divalent group selected from $C_1$-$C_{20}$-alkanediyl group which may optionally be interrupted (by a double bond and/or an imino group) and/or is optionally, completely or partially, a constituent of one or more saturated or unsaturated carbocyclic 5- to 8-membered rings, $X^{M12}$, $X^{M13}$ are independently a straight chain or branched $C_1$ to $C_6$ alkanediyl, $R^{M1}$ is, for each repeating unit 1 to n independently, selected from $R^{M12}$, $C_1$-$C_{20}$-alkyl and $C_1$-$C_{20}$-alkenyl, which may optionally be substituted by hydroxyl, alkoxy or alkoxycarbonyl;

$R^{M12}$ is selected from hydrogen and —($CR^{M13}R^{M14}$—$CR^{M15}R^{M16}$—O)$_r$—H;

$R^{M13}R^{M14}$, $R^{M15}$, $R^{M16}$ are each independently selected from hydrogen, $C_1$-$C_{10}$ alkyl, and —$CH_2$—O-alkyl, p is an integer from 2 to 150;

q is an integer from 0 to 5;

r is the average degree of alkoxylation and is a number from 0.01 to 5.

Such polyaminoamides are described in more detail in WO 11/064154 A2.

Particular preferred fragments Y are those received by reaction of 1-(Bis(3-dimethylamino)propyl)amino)-2-propanol, 4,4-trimethylenedipiperidine, tetramethyl-1,2 ethylenediamine, tetramethyl-1,3 propanediamine, tetramethyl-1,4 butanediamine, tetramethyl-1,6 hexanediamine, tetramethyl-1,8 octanediamine, tetraethyl-1,3 propanediamine, tetramethyl phenylenediamine, bis(dimethylaminoethyl)ether, tetramethyl-2-butene-1,4-diamine, tetramethyl-2,2-dimethyl-1,3 propanediamine. By using a co-monomer, the properties of the additive may be further influenced, e.g. by increasing or decreasing nitrogen-content, hydrophilicity, charge and charge density or other chemical or physical properties.

Most preferred nanotwin promotors are

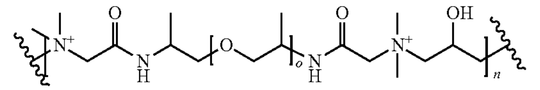

or

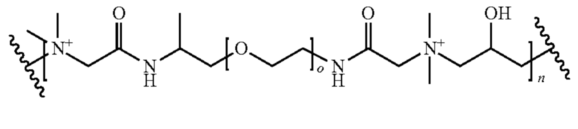

The condensation of the aminoacid and the diamine usually takes place by heating the aminoacid and the diamine, e.g. to temperatures of from 100 to 250° C., preferably form 120 to 200° C., and distilling off the water of reaction which forms in the condensation. If said aminoacid derivatives are used, the condensation may also be carried out at temperatures lower than those given. The preparation of the cationic aminoamide polymers can be carried out without the addition of a catalyst, or alternatively with the use of an acidic or basic catalyst. Suitable acidic catalysts are, for example, acids, such as Lewis acids, e.g. sulfuric acid, p-toluenesulfonic acid, phosphorous acid, hypophosphorous acid, phosphoric acid, methanesulfonic acid, boric acid, aluminum chloride, boron trifluoride, tetraethyl orthotitanate, tin dioxide, tin butyldilaurate or mixtures thereof. Suitable basic catalysts are, for example, alkoxides, such as sodium methoxide or sodium ethoxide, alkali metal hydroxides, such as potassium hydroxide, sodium hydroxide or lithium hydroxide, alkaline earth metal oxides, such as magnesium oxide or calcium oxide, alkali metal and alkaline earth metal carbonates, such as sodium, potassium and calcium carbonate, phosphates, such as potassium phosphate and complex metal hydrides, such as sodium borohydride. Where used, the catalyst is generally used in an amount of from 0.05 to 10% by weight, preferably 0.5 to 1% by weight, based on the total amount of the starting materials.

The reaction can be carried out in a suitable solvent or preferably in the absence of a solvent. If a solvent is used, suitable examples are hydrocarbons, such as toluene or xylene, nitriles, such as acetonitrile, amides, such as N,N-dimethylformamide, N,N-dimethylacetamide, N-methylpyrrolidone, ethers, such as diethylene glycol dimethyl ether, ethylene glycol dimethyl ether, ethylene carbonate, propylene carbonate and the like. The solvent is generally distilled off during the reaction or when the reaction is complete. This distillation can optionally be carried out under a protective gas, such as nitrogen or argon.

In general, the total amount of nanotwin promotors in the electroplating bath is from 0.05 ppm to 10000 ppm based on the total weight of the plating bath. The nanotwin promotors are typically used in a total amount of from about 0.1 ppm to about 1000 ppm and more typically from 2 to 250 ppm based on the total weight of the plating bath, although greater or lesser amounts may be used. Most preferably the nanotwin promotors are used in a total amount of from about 5 ppm to about 100 ppm, particularly from about 7.5 ppm to about 50 ppm based on the total weight of the plating bath.

Other Additives

A large variety of further additives may typically be used in the bath to provide desired surface finishes for the Cu plated metal. Usually more than one additive is used with each additive forming a desired function. Advantageously, the electroplating baths may contain one or more of accelerators, suppressors, levelers, sources of halide ions, grain refiners and mixtures thereof. Most preferably the electroplating bath contains both, an accelerator and a suppressing agent in addition to the nanotwin promotor according to the present invention. Other additives may also be suitably used in the present electroplating baths.

Accelerators

In general any accelerators may be used in the plating baths according to the present invention. As used herein, "accelerator" refers to an organic additive that increases the plating rate of the electroplating bath. The terms "accelerator" and "accelerating agent" are used interchangeably throughout this specification. In literature, sometimes the accelerator component is also named "brightener", "brightening agent", or "depolarizer". Accelerators useful in the present invention include, but are not limited to, compounds comprising one or more sulphur atom and a sulfonic/phosphonic acid or their salts. In one embodiment the composition further comprises at least one accelerating agent. In another embodiment the composition is free of any sulfur-containing accelerating agent.

If present, preferred accelerators have the general structure $MO_3Y^A—X^{A1}—(S)_dR^{A2}$, with:

M is a hydrogen or an alkali metal, preferably Na or K;

$Y^A$ is P or S, preferably S;

d is an integer from 1 to 6, preferably 2;

$X^{A1}$ is selected from a $C_1$-$C_8$ alkanediyl or heteroalkanediyl group, a divalent aryl group or a divalent heteroaromatic group. Heteroalkyl groups will have one or more heteroatom (N, S, O) and 1-12 carbons. Carbocyclic aryl groups are typical aryl groups, such as phenyl or naphthyl. Heteroaromatic groups are also suitable aryl groups and contain one or more N, O or S atom and 1-3 separate or fused rings.

$R^{A2}$ is selected from H or $(—S—X^{A1'}Y^AO_3M)$, wherein $X^{A1'}$ is independently selected from group $X^{A1}$.

More specifically, useful accelerators include those of the following formulae:

$MO_3S—X^{A1}—SH$ $MO_3S—X^{A1}—S—S—X^{A1'}—SO_3M$ $MO_3S—Ar—S—S—Ar—SO_3M$ wherein $X^{A1}$ is as defined above and Ar is aryl.

Particularly preferred accelerating agents are:

SPS: bis-(3-sulfopropyl)-disulfide

MPS: 3-mercapto-1-propansulfonic acid.

Both are usually applied in form of their salts, particularly their sodium salts.

Other examples of accelerators, used alone or in mixture, include, but are not limited to: MES (2-Mercaptoethanesulfonic acid, sodium salt); DPS (N,N-dimethyldithiocarbamic acid (3-sulfopropylester), sodium salt); UPS (3-[(amino-iminomethyl)-thio]-1-propylsulfonic acid); ZPS (3-(2-benzthiazolylthio)-1-propanesulfonic acid, sodium salt); 3-mercapto-propylsulfonicacid-(3-sulfopropyl)ester; methyl-(ω-sulphopropyl)-disulfide, disodium salt; methyl-(ω-sulphopropyl)-trisulfide, disodium salt.

If used, such accelerators are typically used in an amount of about 0.1 ppm to about 3000 ppm, based on the total weight of the plating bath. Particularly suitable amounts of accelerator useful in the present invention are 1 to 500 ppm, and more particularly 2 to 100 ppm.

Suppressing Agents

Suppressing agents may be used in combination with the additives according to the present inventions. As used herein, "suppressing agents" are additives which increase the overpotential during electrodeposition. There terms "surfactant" and "suppressing agent" are synonymously used since the suppressing agents described herein are also surface-active substances. Usually suppressing agents are polyalkylene oxides comprising oxy($C_2$ to $C_4$)alkylene homo- or copolymers, obtainable by polyoxyalkylation of an alcohol or amine starter. In one embodiment the composition further comprises at least one suppressing agent. In another embodiment the composition is free of any polyol suppressing agent, particularly free of any polyalkylene glycol and polyoxyalkylene-type suppressing agent, most particularly free of any polyoxyalkylene-type suppressing agent.

If present, particularly useful suppressing agents are:

(a) Suppressing agents obtainable by reacting an amine compound comprising at least three active amino functional groups with a mixture of ethylene oxide and at least one compound selected from $C_3$ and $C_4$ alkylene oxides as described in WO 2010/115796.

Preferably the amine compound is selected from diethylene triamine, 3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(b) Suppressing agents obtainable by reacting an amine compound comprising active amino functional groups with a mixture of ethylene oxide and at least one compound selected from $C_3$ and $C_4$ alkylene oxides, said suppressing agent having a molecular weight $M_w$ of 6000 g/mol or more, forming an ethylene $C_3$ and/or $C_4$ alkylene random copolymer as described in WO 2010/115756.

(c) Suppressing agent obtainable by reacting an amine compound comprising at least three active amino functional groups with ethylene oxide and at least one compound selected from $C_3$ and $C_4$ alkylene oxides from a mixture or in sequence, said suppressing agent having a molecular weight $M_w$ of 6000 g/mol or more as described in WO 2010/115757.

Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxyatridecane-1,13-diamine, triethylene glycol diamine, diethylene triamine, (3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(d) Suppressing agent selected from compounds of formula S1

(S1)

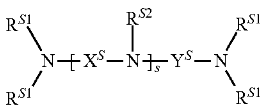

wherein the $R^{S1}$ radicals are each independently selected from a copolymer of ethylene oxide and at least one further $C_3$ to $C_4$ alkylene oxide, said copolymer being a random copolymer, the R$2 radicals are each independently selected from $R^{S1}$ or alkyl, $X^S$ and $Y^S$ are spacer groups independently, and $X^S$ for each repeating unit s independently, selected from $C_2$ to $C_6$ alkandiyl and $Z^S—(O—Z^S)$, wherein the $Z^S$ radicals are each independently selected from $C_2$ to $C_6$ alkandiyl, s is an integer equal to or greater than 0, and t is an integer equal to or greater than 1, as described in WO 2010/115717.

Preferably spacer groups $X^S$ and $Y^S$ are independently, and $X^S$ for each repeating unit independently, selected from $C_2$ to $C_4$ alkylene. Most preferably $X^S$ and $Y^S$ are independently, and $X^S$ for each repeating unit s independently, selected from ethylene ($—C_2H_4—$) or propylene ($—C_3H_6—$).

Preferably $Z^S$ is selected from $C_2$ to $C_4$ alkylene, most preferably from ethylene or propylene.

Preferably s is an integer from 1 to 10, more preferably from 1 to 5, most preferably from 1 to 3.

Preferably t is an integer from 1 to 10, more preferably from 1 to 5, most preferably from 1 to 3.

In another preferred embodiment the $C_3$ to $C_4$ alkylene oxide is selected from propylene oxide (PO). In this case EO/PO copolymer side chains are generated starting from the active amino functional groups The content of ethylene oxide in the copolymer of ethylene oxide and the further $C_3$ to $C_4$ alkylene oxide can generally be from about 5% by weight to about 95% by weight, preferably from about 30% by weight to about 70% by weight, particularly preferably between about 35% by weight to about 65% by weight.

The compounds of formula (S1) are prepared by reacting an amine compound with one ore more alkylene oxides. Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl) amino)propylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylene-diamine.

The molecular weight $M_w$ of the suppressing agent of formula S1 may be between about 500 g/mol to about 30000 g/mol. Preferably the molecular weight $M_w$ should be about 6000 g/mol or more, preferably from about 6000 g/mol to about 20000 g/mol, more preferably from about 7000 g/mol to about 19000 g/mol, and most preferably from about 9000 g/mol to about 18000 g/mol. Preferred total amounts of alkylene oxide units in the suppressing agent may be from about 120 to about 360, preferably from about 140 to about 340, most preferably from about 180 to about 300.

Typical total amounts of alkylene oxide units in the suppressing agent may be about 110 ethylene oxide units (EO) and 10 propylene oxide units (PO), about 100 EO and 20 PO, about 90 EO and 30 PO, about 80 EO and 40 PO, about 70 EO and 50 PO, about 60 EO and 60 PO, about 50 EO and 70 PO, about 40 EO and 80 PO, about 30 EO and 90 PO, about 100 EO and 10 butylene oxide (BO) units, about 90 EO and 20 BO, about 80 EO and 30 BO, about 70 EO and 40 BO, about 60 EO and 50 BO or about 40 EO and 60 BO to about 330 EO and 30 PO units, about 300 EO and 60 PO, about 270 EO and 90 PO, about 240 EO and 120 PO, about 210 EO and 150 PO, about 180 EO and 180 PO, about 150 EO and 210 PO, about 120 EO and 240 PO, about 90 EO and 270 PO, about 300 EO and 30 BO units, about 270 EO and 60 BO, about 240 EO and 90 BO, about 210 EO and 120 BO, about 180 EO and 150 BO, or about 120 EO and 180 BO.

(e) Suppressing agent obtainable by reacting a polyhydric alcohol condensate compound derived from at least one polyalcohol of formula (S2)$X^S(OH)_u$ by condensation with at least one alkylene oxide to form a polyhydric alcohol condensate comprising polyoxyalkylene side chains, wherein u is an integer from 3 to 6 and $X^S$ is an u-valent linear or branched aliphatic or cycloaliphatic radical having from 3 to 10 carbon atoms, which may be substituted or unsubstituted, as described in WO 2011/012462.

Preferred polyalcohol condensates are selected from compounds of formulae (S2a)

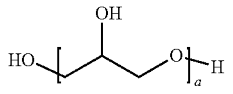

(S2b)

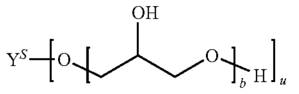

(S2c)

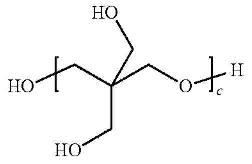

wherein $Y^S$ is an u-valent linear or branched aliphatic or cycloaliphatic radical having from 1 to 10 carbon atoms, which may be substituted or unsubstituted, a is an integer from 2 to 50, b may be the same or different for each polymer arm u and is an integer from 1 to 30, c is an integer from 2 to 3, and u is an integer from 1 to 6. Most preferred Polyalcohols are glycerol condensates and/or pentaerythritol condensates.

(f) Suppressing agent obtainable by reacting a polyhydric alcohol comprising at least 5 hydroxyl functional groups with at least one alkylene oxide to form a polyhydric alcohol comprising polyoxyalkylene side chains as described in WO 2011/012475. Preferred polyalcohols are linear or cyclic monosaccharide alcohols represented by formula (S3a) or (S3b)

$$HOCH_2—(CHOH)_v—CH_2OH \quad (S3a)$$

$$(CHOH)_w \quad (S3b)$$

wherein v is an integer from 3 to 8 and w is an integer from 5 to 10. Most preferred monosaccharide alcohols are sorbitol, mannitol, xylitol, ribitol and inositol. Further preferred polyalcohols are monosaccharides of formula (S4a) or (S4b)

$$CHO—(CHOH)_x—CH_2OH \quad (S4a)$$

$$CH_2OH—(CHOH_y—CO—(CHOH)_z—CH_2OH \quad (S4b)$$

wherein x is an integer of 4 to 5, and y, z are integers and y+z is 3 or 4. Most preferred monosaccharide alcohols are selected from the aldoses allose, altrose, galactose, glucose, gulose, idose, mannose, talose, glucoheptose, mannoheptose or the ketoses fructose, psicose, sorbose, tagatose, mannoheptulose, sedoheptulose, taloheptulose, alloheptulose.

(g) amine-based polyoxyalkylene suppressing agents based on cyclic amines show extraordinary superfilling properties, as described in WO 2018/073011.

(h) polyamine-based or polyhydric alcohol-based suppressing agents which are modified by reaction with a compound, such as but not limited to glycidole or glycerol carbonate, that introduce a branching group into the suppressing agent before they are reacted with alkylene oxides show extraordinary superfilling properties, as described in WO 2018/114985.

When suppressors are used, they are typically present in an amount in the range of from about 1 to about 10,000 ppm based on the weight of the bath, and preferably from about 5 to about 10,000 ppm. In one embodiment the composition is free of any suppressing agents described in this section.

Leveling Agents

Additional leveling agents may be used in the copper electroplating baths according to the present invention.

Suitable leveling agents include, but are not limited to, one or more of other polyethylene imines and derivatives thereof, quaternized polyethylene imine, polyglycine, poly (allylamine), polyaniline, polyurea, polyacrylamide, poly (melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole as described e.g. in WO 2011/151785 A1, polyvinylpyrrolidone, polyaminoamides as described e.g. in WO 2011/064154 A2 and WO 2014/072885 A2, or copolymers thereof, nigrosines, pentamethyl-para-rosaniline hydrohalide, hexamethyl-pararosaniline hydrohalide, di- or trialkanolamines and their derivatives as described in WO 2010/069810, biguanides as described in WO 2012/085811 A1, or a compound containing a functional group of the formula N—R—S, where R is a substituted alkyl, unsubstituted alkyl, substituted aryl or unsubstituted aryl. Typically, the alkyl groups are $C_1$-$C_6$ alkyl and preferably $C_1$-$C_4$ alkyl. In general, the aryl groups include $C_6$-$C_{20}$ aryl, preferably $C_6$-$C_{10}$ aryl. It is preferred that the aryl group is phenyl or naphthyl. The compounds containing a functional group of the formula N—R—S are generally known, are generally commercially available and may be used without further purification.

In such compounds containing the N—R—S functional group, the sulfur ("S") and/or the nitrogen ("N") may be attached to such compounds with single or double bonds. When the sulfur is attached to such compounds with a single bond, the sulfur will have another substituent group, such as but not limited to hydrogen, $C_1$-$C_{12}$ alkyl, $C_2$-$C_{12}$ alkenyl, $C_6$-$C_{20}$ aryl, $C_1$-$C_{12}$ alkylthio, $C_2$-$C_{12}$ alkenylthio, $C_6$-$C_{20}$ arylthio and the like. Likewise, the nitrogen will have one or more substituent groups, such as but not limited to hydrogen, $C_1$-$C_{12}$ alkyl, $C_2$-$C_{12}$ alkenyl, $C_7$-$C_{10}$ aryl, and the like. The N—R—S functional group may be acyclic or cyclic. Compounds containing cyclic N—R—S functional groups include those having either the nitrogen or the sulfur or both the nitrogen and the sulfur within the ring system.

More details and alternatives are described in WO 2018/219848, WO 2016/020216, and WO 2010/069810, respectively, which are incorporated herein by reference.

In one embodiment the composition further comprises at least one leveling agent as disclosed above. In another embodiment the composition is free of any leveling agent described in this section.

If used, in general, the total amount of leveling agents in the electroplating bath is from 0.5 ppm to 10000 ppm based on the total weight of the plating bath. The leveling agents according to the present invention are typically used in a total amount of from about 100 ppm to about 10000 ppm based on the total weight of the plating bath, although greater or lesser amounts may be used.

Electrolyte

The electroplating composition according to the present invention comprises and electrolyte comprising copper ions and an acid.

Copper Ions

The source of copper ions may be any compound capable of releasing metal ions to be deposited in the electroplating bath in sufficient amount, i.e. is at least partially soluble in the electroplating bath. It is preferred that the metal ion source is soluble in the plating bath. Suitable metal ion sources are metal salts and include, but are not limited to, sulfates, halides, acetates, nitrates, fluoroborates, alkylsulfonates, arylsulfonates, sulfamates, metal gluconates and the like.

The copper ion source may be used in the present invention in any amount that provides sufficient metal ions for electroplating on a substrate. Copper is typically present in an amount in the range of from about 1 to about 300 g/l of plating solution, preferably from about 20 to about 100 g/l, most preferably from about 40 to about 70 g/l.

In a preferred embodiment the plating solution is essentially free of tin, that is, they contain below 1% by weight tin, more preferably below 0.1% by weight tin, and yet more preferably below 0.01% by weight tin, and still more preferably are free of tin. In another preferred embodiment the plating solution is essentially free of any alloying metal, that is, they contain below 1% by weight alloying metal, more preferably below 0.1% by weight alloying metal, even more preferably below 0.01% by weight alloying metal, and still more preferably are free of alloying metal. Most preferably the metal ions consist of copper ions, i.e. are free of any other ions besides copper.

Acid

The plating baths of the invention are acidic, that is, they have a pH below 7. Typically, the pH of the copper electroplating composition is below 4, preferably below 3, most preferably below 2. The pH mainly depends on the concentration of the acid present in the composition.

Suitable acids include inorganic acids and organic acids, such as, but not limited to, sulfuric acid, acetic acid, fluoroboric acid, alkylsulfonic acids such as methanesulfonic acid, ethanesulfonic acid, propanesulfonic acid and trifluoromethane sulfonic acid, arylsulfonic acids such as phenyl sulfonic acid and toluenesulfonic acid, sulfamic acid, hydrochloric acid, and phosphoric acid. Sulfuric acid and methanesulfonic acid are preferred.

The acids are typically present in an amount in the range of from about 1 to about 300 g/l, preferably from about 5 to about 200 g/l, most preferably from about 7.5 to about 50 g/l.

Such electrolytes may optionally (and preferably) contain a source of halide ions, such as chloride ions as in copper chloride or hydrochloric acid. A wide range of halide ion concentrations may be used in the present invention such as from about 0 to about 500 ppm. Preferably, the halide ion concentration is in the range of from about 10 to about 100 ppm based on the plating bath. It is preferred that the electrolyte is sulfuric acid or methanesulfonic acid, and preferably a mixture of sulfuric acid or methanesulfonic acid and a source of chloride ions. The acids and sources of halide ions useful in the present invention are generally commercially available and may be used without further purification.

Electroplating Bath

The present electroplating compositions are suitable for depositing a copper-containing layer, which may preferably be a pure copper layer.

In general, besides the copper ions and at least one of the nanotwin promotors, the present copper electroplating compositions preferably comprise an electrolyte, i. e. acidic or alkaline electrolyte, preferably an acidic electrolyte, optionally halide ions, and optionally other additives like accelerators or suppressing agents.

Such baths are typically aqueous. In general, as used herein "aqueous" means that the present electroplating compositions comprises a solvent comprising at least 50% by weight of water. Preferably, "aqueous" means that the major part of the composition is water, more preferably 90% by weight of the solvent is water, most preferably the solvent consists or essentially consists of water. Any type of water may be used, such as distilled, deinonized or tap. Furthermore, such baths are typically homogenous solutions, i.e. they are free of any particles.

It was found that the introduction of other organic electroplating compounds have a negative impact or may even disrupt the ability of the nanotwin propomors to produce nanotwinned copper. These prohibitive compounds include all organic additives that are usually present in a copper electroplating bath, particularly accelerators, suppressing agents, surfactants, and/or leveling agents. Thus, in a preferred embodiment, the electroplating composition is at least substantially free of any accelerator, suppressing agent, surfactant, and/or leveling agent. In another preferred composition the the electroplating composition is at least substantially free of any sulfur containing compounds (typical accelerators) and polyol compounds, particularly polyalkylene oxide compounds (typical suppressors).

In one preferred embodiment, the copper electroplating composition of the present invention comprises:

a) about 20 to about 60 g/l, preferably about 30 to about 50 g/l copper ions;
b) about 5 to about 70 g/l, preferably about 7.5 to about 40 g/l of an acid, particularly sulfuric acid;
c) about 20 to about 120 mg/l halide ions, preferably about 30 to about 70 mg/l halide ions particularly chloride ions;
d) about 5 to about 250 mg/l, preferably about 7.5 to about 100 mg/l of the nanotwin promotor as described herein, wherein the composition is free of any sulfur-containing accelerators or compounds and free of any polyol suppressing agents or compounds, particularly polyglycols and polyalkylene oxides.

As used herein, "substantially free of" means that the electroplating composition contains less than 10 ppm, more preferably less than about 5 ppm, and most preferably less than about 2 ppm of any compound that can function as an accelerator, suppressing agent, or leveling agent.

In another preferred embodiment, the electroplating composition consists essentially of a copper electroplating composition capable of electrodepositing nanotwinned copper, the electroplating composition consisting essentially or consisting of:

a) copper ions;
b) an acid, particularly sulfuric acid;
c) halide ions, particularly chloride ions;
d) the nanotwin promotor as described herein.

In yet another preferred embodiment, the electroplating composition consists essentially of a copper electroplating composition capable of electrodepositing nanotwinned copper, the electroplating composition consisting essentially of or consisting of:

a) about 40 to about 60 g/l copper ions;
b) about 80 to about 140 g/l of an acid, particularly sulfuric acid;
c) about 30 to about 120 mg/l halide ions, particularly chloride ions;
d) about 300 to about 500 mg/l of the nanotwin promotor as described herein.

In yet another preferred embodiment, the electroplating composition consists essentially of a copper electroplating composition capable of electrodepositing nanotwinned copper, the electroplating composition consisting essentially of or consisting of:

a) about 20 to about 60 g/l, preferably about 30 to about 50 g/l copper ions;
b) about 5 to about 70 g/l, preferably about 7.5 to about 40 g/l of an acid, particularly sulfuric acid;
c) about 20 to about 120 mg/l halide ions, preferably about 30 to about 70 mg/l halide ions particularly chloride ions;
d) about 2 to about 250 mg/l, preferably about 5 to about 100 mg/l, most preferably about 5 to about 50 mg/l of the nanotwin promotor as described herein.

Process

The compositions comprising the nanotwin promotors are particularly useful for electrodepositing nanotwinned copper, preferably in in (111) orientation, with a high amount of nanotwinning on a substrate, particularly a semiconductor substrate.

In general, when the present invention is used to deposit copper on a substrate the plating baths are agitated during use. Any suitable agitation method may be used with the present invention and such methods are well-known in the art. Suitable agitation methods include, but are not limited to, inert gas or air sparging, work piece agitation, impingement and the like. Such methods are known to those skilled in the art. When the present invention is used to plate an integrated circuit substrate, such as a wafer, the wafer may be rotated such as from 1 to 150 RPM and the plating solution contacts the rotating wafer, such as by pumping or spraying. In the alternative, the wafer need not be rotated where the flow of the plating bath is sufficient to provide the desired metal deposit.

Plating equipments for plating semiconductor substrates are well known. Plating equipment comprises an electroplating tank which holds copper electrolyte and which is made of a suitable material such as plastic or other material inert to the electrolytic plating solution. The tank may be cylindrical, especially for wafer plating. A cathode is horizontally disposed at the upper part of tank and may be any type substrate such as a silicon wafer having openings.

These additives can be used with soluble and insoluble anodes in the presence or absence of a membrane or membranes separating the catholyte from the anolyte.

The cathode substrate and anode are electrically connected by wiring and, respectively, to a power supply. The cathode substrate for direct or pulse current has a net negative charge so that the metal ions in the solution are reduced at the cathode substrate forming plated metal on the cathode surface. An oxidation reaction takes place at the anode. The cathode and anode may be horizontally or vertically disposed in the tank.

The current density is generally in the range of about 0.01 to about 50 ASD, more preferably about 0.5 to about 20 ASD, most preferably about 1 to about 10 ASD. In addition, the electroplating solution is preferably agitated, and the electroplating solution is generally mixed at about 1 to about 2,500 rpm, more preferably about 10 to about 1,200 rpm, most preferably about 50 to about 400 rpm.

In general, when preparing copper bumps, a photoresist layer is applied to a semiconductor wafer, followed by standard photolithographic exposure and development techniques to form a patterned photoresist layer (or plating mask) having recessed features or vias therein. The dimensions of the dielectric plating mask (thickness of the plating mask and the size of the openings in the pattern) defines the size and location of the copper layer deposited over the I/O pad and UBM. The diameter of such deposits typically range of from 1 to 300 μm, preferably in the range from 2 to 100 μm. Usually, the recesses provided by the plating mask are not fully but only partly filled. After filling the openings in the plating mask with copper, the plating mask is removed, and then the copper bumps are usually subjected to reflow processing.

Generally the substrate to be plated does not need to have a specific orientation to allow copper nanotwin deposition. However, it is preferred that the substrate to be plated comprises a copper seed layer with a dominan <111> orientation.

Typically, the plating baths of the present invention may be used at any temperature from 10 to 65° C. or higher. It is preferred that the temperature of the plating baths is from 10 to 35 "C and more preferably from 15 degrees to 30° C.

All percent, ppm or comparable values refer to the weight with respect to the total weight of the respective composition except where otherwise indicated. All cited documents are incorporated herein by reference.

The following examples shall further illustrate the present invention without restricting the scope of this invention.

Analytical Methods

The molecular mass ($M_w$) was determined by size exclusion chromatography (SEC) using hexafluoroisopropanol containing 0.1% potassium trifluoroacetat as eluent, hexafluoroisopropanol-packed (HFIP) gel columns as stationary phase. Polymethylmethacrylate (PMMA) standards was used as standard for determination of the molecular weights. The temperature of the column was 35° C., the injection volume 50 μl (microliter) and the flow rate 1 mL/min. The weight average molecular weight ($M_w$), the number average molecular weight ($M_n$) and the polydispersity (PDI=$M_w$/$M_n$) were determined.

The amine number was determined according to DIN 53176 by titration of a solution of the polymer in acetic acid with perchloric acid.

The substrates were blanket wafer pieces comprising a Cu-seed layer with a dominant <111> orientation.

The presence of nanotwinned grain structures can be observed using any suitable microscopy technique, such as an electron microscopy technique. The amount of nanotwinned grain structure in the copper deposit is preferably greater than about 80%, more preferably greater than about 90% nanotwinned columnar copper grains, which is estimated based on SEM cross-sections.

As set forth in the examples below, nanotwinned copper structures may be characterized by a plurality of (111)-oriented crystal copper grains containing a majority of nanotwins. In some implementations, the plurality of (111)-oriented crystal copper grains contain a high amount of nanotwins.

The crystal orientation of the crystal copper grains may be characterized using a suitable technique such as electron backscatter diffraction (EBSD) analysis. In some implementations, crystal orientation maps may be displayed in inverse pole figure (IPF) maps. In accordance with the present invention, it is preferably that the nanotwinned copper structures contain primarily (111)-oriented grains.

The electroplated copper was investigated by FIB-SEM.

EXAMPLES

Example 1: Nanotwin Promotor Preparation

Example 1.1

The reaction was placed in a 0.5 l reactor equipped with a stirrer, condenser tube, thermometer, and nitrogen inlet pipe. Poly(propylene glycol) bis(2-aminopropyl ether (n~2), available from BASF, (150.0 g) and hypophosphoric acid (0.3 g) were placed into the reactor under nitrogen atmosphere and heated up to 80° C. Then N,N-Dimethylglycine (129.7 g) was added in portion over a period of 20 min. After complete addition of the acid, the reaction mixture was stirred at 120° C. for 1 h. Then the temperature was increased up to 150° C. and the reaction mixture was stirred over 8 hours while removing the resulting water out of the system. A pre-product was obtained as brown oil with an amine value of 5.2 mmol/g (yield: 93%).

The pre-product (85 g) and water (123 g) were placed into a 250 ml flask, heated up to 80° C. and stirred over 20 min. Then epichlorohydrin (37.9 g) was added dropwise over a period of 90 min. To complete the reaction, the mixture post-react for 18 h until the Preussmann test was negative. The product (nanotwin promotor 1) was obtained as orange, viscous solution with a chloride value of 1.4 mmol/g (yield: 99%).

Example 1.2

The reaction was placed in a 250 ml flask equipped with a stirrer, condenser tube, thermometer, and nitrogen inlet pipe. Diaminobutan (46 g) and hypophosphoric acid (0.1 g) were placed into the reactor under nitrogen atmosphere and heated up to 80° C. Then N,N-Dimethylglycine (108.9 g) was added in portion over a period of 45 min. After complete addition of the acid, the reaction mixture was stirred at 120° C. for 1 h. Then the temperature was increased up to 150° C. and the reaction mixture was stirred over 8 hours while removing the resulting water out of the system. A pre-product was obtained as yellow waxy solid with an amine value of 7.8 mmol/g (yield: 93%).

The pre-product (50 g) and water (84 ml) were placed into a 250 ml flask, heated up to 80° C. and stirred over 20 min. Then epichlorohydrin (33.6 g) was added dropwise over a period of 90 min. To complete the reaction, the mixture post-react for 19 h until the Preussmann test was negative. The product (nanotwin promotor 2) was obtained as orange, viscous solution with a chloride value of 2.1 mmol/g (yield: 97%).

Example 1.3

The reaction was placed in a 0.25 l reactor equipped with a stirrer, condenser tube, thermometer, and nitrogen inlet pipe. 1,2-Propylenediamine (37.06 g) and hypophosphoric acid (0.13 g) were placed into the reactor under nitrogen atmosphere and heated up to 80° C. Then N,N-Dimethylglycine (106.31 g) was added in portion over a period of 20 min. After complete addition of the acid, the reaction mixture was stirred at 120° C. for 1 h. Then the temperature was increased up to 150° C. and the reaction mixture was stirred over 8 hours while removing the resulting water out of the system. The pre-product 3 was obtained as orange wax with an amine value of 8.5 mmol/g (yield: 84%).

The pre-product 3 (47 g) and water (81 ml) were placed into a 250 ml flask, heated up to 80° C. and stirred over 20 min. Then epichlorohydrin (33.95 g) was added dropwise over a period of 90 min. To complete the reaction, the mixture post-react for 15 h until the Preussmann test was negative. The product (nanotwin promotor 3) was obtained as orange, viscous solution with a chloride value of 1.9 mmol/g (yield: 97%).

Example 1.4

The reaction was placed in a 250 ml flask equipped with a stirrer, condenser tube, thermometer, and nitrogen inlet pipe. 1,2-Ethylenediamine (30 g) and hypophosphoric acid (0.1 g) were placed into the reactor under nitrogen atmosphere and heated up to 80° C. Then N,N-Dimethylglycine (103.1 g) was added in portion over a period of 50 min. After complete addition of the acid, the reaction mixture was stirred at 120° C. for 1 h. Then the temperature was increased up to 150° C. and the reaction mixture was stirred over 8 hours while removing the resulting water out of the system. The pre-product 4 was obtained as brown solid with an amine value of 8.7 mmol/g (yield: 89%).

The pre-product 4 (50 g) and water (87 ml) were placed into a 250 ml flask, heated up to 80° C. and stirred over 20 min. Then epichlorohydrin (37.01 g) was added dropwise over a period of 90 min. To complete the reaction, the mixture post-react for 15 h until the Preussmann test was negative. The product (nanotwin promotor 4) was obtained as orange, viscous solution with a chloride value of 2.1 mmol/g (yield: 98%).

Example 1.5

The reaction was placed in a 250 ml flask equipped with a stirrer, condenser tube, thermometer, and nitrogen inlet pipe. 1,6-Hexanediamine (46.5 g) and hypophosphoric acid (0.04 g) were placed into the reactor under nitrogen atmosphere and heated up to 80° C. Then N,N-Dimethylglycine (85.05 g) was added in portion over a period of 90 min. After complete addition of the acid, the reaction mixture was stirred at 120° C. for 1 h. Then the temperature was increased up to 150° C. and the reaction mixture was stirred over 8 hours while removing the resulting water out of the system. The pre-product 5 was obtained as yellow waxy solid with an amine value of 7.0 mmol/g (yield: 95%).

The pre-product 5 (100 g) and water (160 ml) were placed into a 500 ml flask, heated up to 80° C. and stirred over 20 min. Then epichlorohydrin (59,9 g) was added dropwise over a period of 90 min. To complete the reaction, the mixture post-react for 18 h until the Preussmann test was negative. The product (nanotwin promotor 5) was obtained as orange, viscous solution with a chloride value of 1.9 mmol/g (yield: 98%).

Example 1.6

The reaction was placed in a 500 ml flask equipped with a stirrer, condenser tube, thermometer, and nitrogen inlet pipe. Diethylenetriamine (72.2 g) and hypophosphoric acid (0.12 g) were placed into the reactor under nitrogen atmosphere and heated up to 80° C. Then N,N-Dimethylglycine (144.4 g) was added in portion over a period of 20 min. After complete addition of the acid, the reaction mixture was stirred at 120° C. for 1 h. Then the temperature was increased up to 150° C. and the reaction mixture was stirred over 15 hours while removing the resulting water out of the system. The pre-product 6 was obtained as yellow waxy solid with an amine value of 11.0 mmol/g (yield: 92%).

The pre-product 6 (90.9 g) and water (176.2 ml) were placed into a 500 ml flask, heated up to 80° C. and stirred over 20 min. Then epichlorohydrin (85.4 g) was added dropwise over a period of 90 min. To complete the reaction, the mixture post-react for 18 h until the Preussmann test was negative. The product (nanotwin promotor 6) was obtained as orange, viscous solution with a chloride value of 2.0 mmol/g (yield: 95%).

Example 1.7

The reaction was placed in a 500 ml flask equipped with a stirrer, condenser tube, thermometer, and nitrogen inlet pipe. Dimethylaminopropylamine (111.9 g) was placed into the reactor under nitrogen atmosphere and heated up to 80° C. Then Dimethylsuccinate (80.0 g) was added in portion over a period of 110 min. After complete addition, the reaction mixture was stirred at 80° C. for 1 h. Then the temperature was increased up to 100° C. and the reaction mixture was stirred over 12 hours while removing the resulting methanol out of the system. The comonomer 1 was obtained as yellow waxy solid with an amine value of 6.8 mmol/g (yield: 91%).

The pre-product 2 (38 g), comonomer 1 (0.2 g) and water (66.3 ml) were placed into a 250 ml flask, heated up to 80° C. and stirred over 20 min. Then epichlorohydrin (26.3 g) was added dropwise over a period of 90 min. To complete the reaction, the mixture post-react for 18 h until the Preussmann test was negative. The product (nanotwin promotor 7) was obtained as orange, viscous solution with a chloride value of 2.0 mmol/g (yield: 99%).

Example 1.8

N,N-Bis(3-aminopropyl)methyl amine (252 g, 1.74 mol) was placed into a 2 l reactor and stirred under constant nitrogen stream. Water (67 g) was added resulting in a temperature increase up to 45° C. The solution was heated up to 85° C. and adipic acid (240 g, 1.64 mol) was added in portions during 20 min. During this time the temperature increased up to 100° C. Then the reaction mixture was stirred for 1 h at 120° C., the color turning into orange. Subsequently, the temperature was increased to 170° C. and the reaction water was distilled off for 4 h. Then the nitrogen stream was intensified to remove residual traces of water. The heating was turned off and when the temperature reached 160° C., water (250 g) was added slowly. After cooling to 80° C., water (1328 g) was added again, resulting in a yellow solution of co-monomer 2 (1987 g), having an amine number of 0.92 mmol/g. The product had an average molecular weight of Mw=42.300 g/mol and a polydispersity of Mw/Mn=2.0.

The pre-product 2 (10 g), comonomer 2 (2.3 g) and water (14.8 ml) were placed into a 100 ml flask, heated up to 80° C. and stirred over 20 min. Then epichlorohydrin (6.6 g) was added dropwise over a period of 90 min. To complete the reaction, the mixture post-react for 5 h until the Preussmann test was negative. The product (nanotwin promotor 8) was obtained as yellow solution with a chloride value of 2.2 mmol/g (yield: 91%).

Example 1.9

The pre-product 2 (10 g), 3-(Dimethylamino)propylamine (10 g) and water (31.5 ml) were placed into a 100 ml flask, heated up to 80° C. and stirred over 20 min. Then epichlorohydrin (11.5 g) was added dropwise over a period of 90 min. To complete the reaction, the mixture post-react for 5 h 40 min. until the Preussmann test was negative. The product (nanotwin promotor 9) was obtained as orange solution, having a chloride value of 2.0 mmol/g (yield: 94%).

Example 2: Electroplating Experiments

Example 2.1

A copper electroplating bath containing 40 g/l Cu Ions, 10 g/l sulfuric acid and 50 ppm chloride was used for the studies. In addition, the bath contained 10 ppm of the nanotwin promotor prepared in example 1.1.

The substrate was electrically connected prior plating. The copper layer was plated by using an RDE set-up. The electrolyte convection was realized by rotating the RDE. The rotating speed in the experiments was 100 RPM. Bath temperature was controlled and set to 25° C. A current density of 1 ASD was applied for 68 min resulting in a copper layer of approximately 15 μm thickness.

The grain structure of the plated copper films was examined by FIB-SEM. The thickness of the transition layer was determined by measuring the average distance between seed layer and when nanotwin layer growth starts.

Figure 1B:
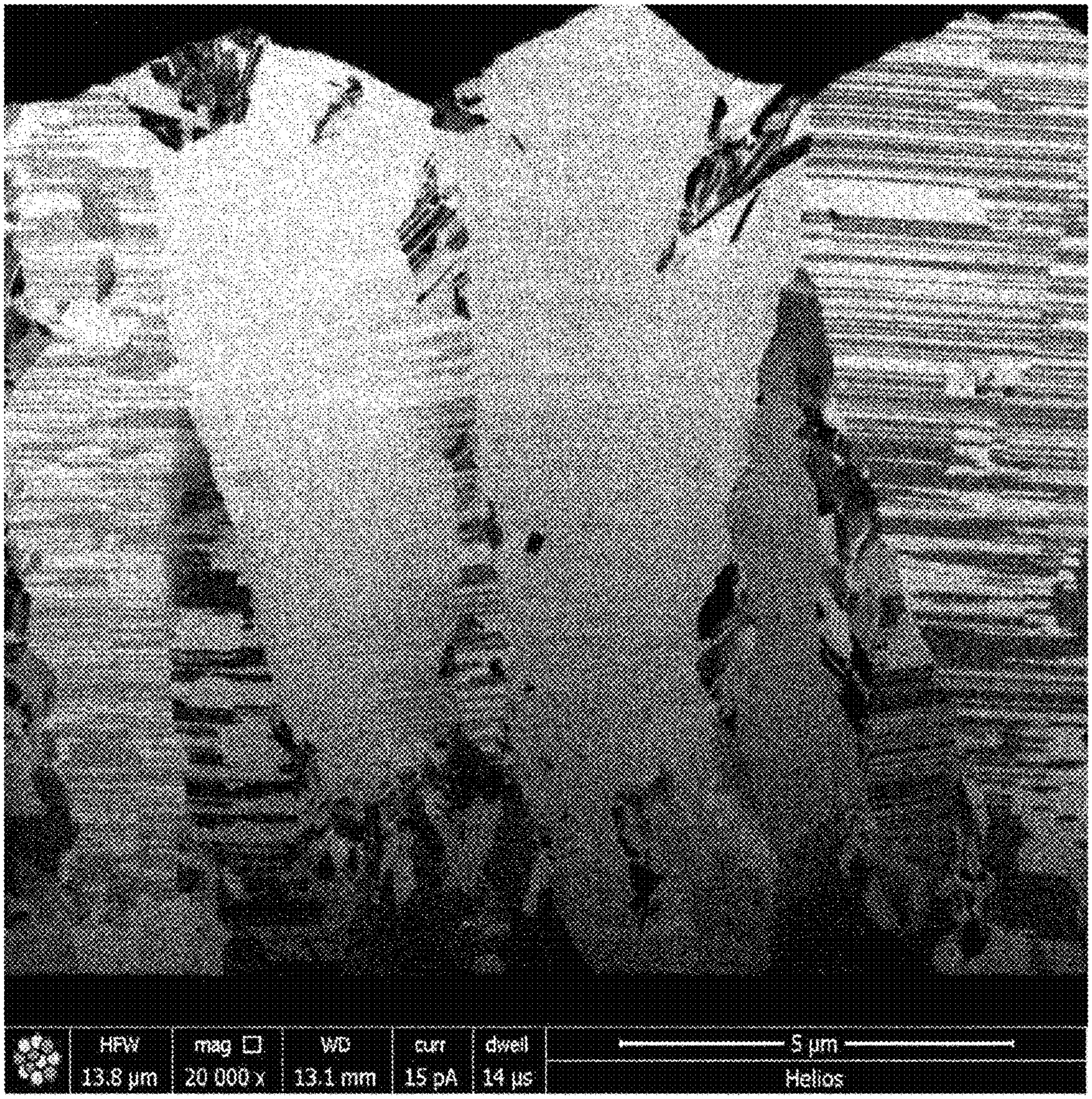
FIG. 1*b* shows a detailed FIB-SAM picture of a nanotwinned copper layer electrodeposited using a composition according to example 2.1.

An overview picture is shown in FIG. 1*a* and more detailed picture is shown in FIG. 1*b*. The desired nanotwin formation can be easily seen from the horizontally layered structure. The thickness of the transition layer is depicted in table 1.

Example 2.2

Example 2.1 was repeated with 10 ppm of the nanotwin promotor prepared in example 1.2 and a current density of 0.5 ASD.

Figure 2:
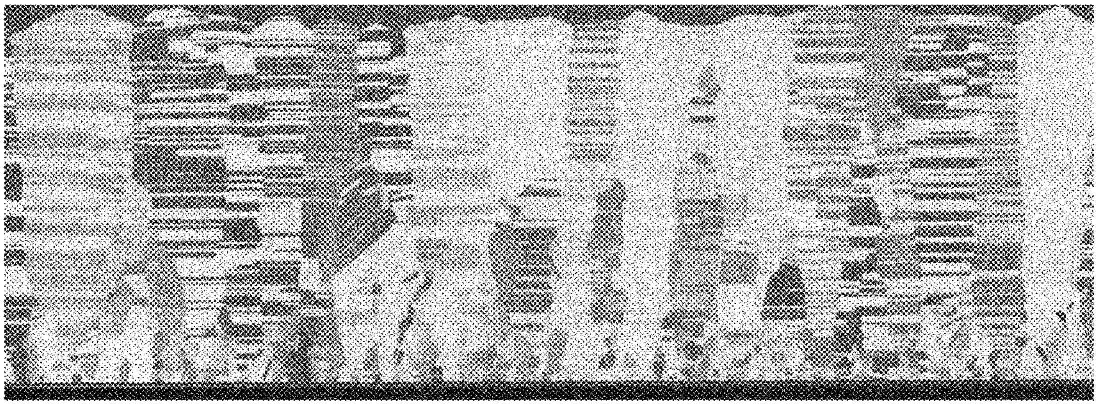
FIG. 2 shows a detailed FIB-SAM picture of a nanotwinned copper layer electrodeposited using a composition according to example 2.2.

A picture of the deposited copper is shown in FIG. 2. The desired nanotwin formation can be easily seen from the horizontally layered structure. The thickness of the transition layer is depicted in table 1.

Example 2.3

Example 2.2 was repeated with 200 ppm of the nanotwin promotor prepared in example 1.3.

Figure 3:
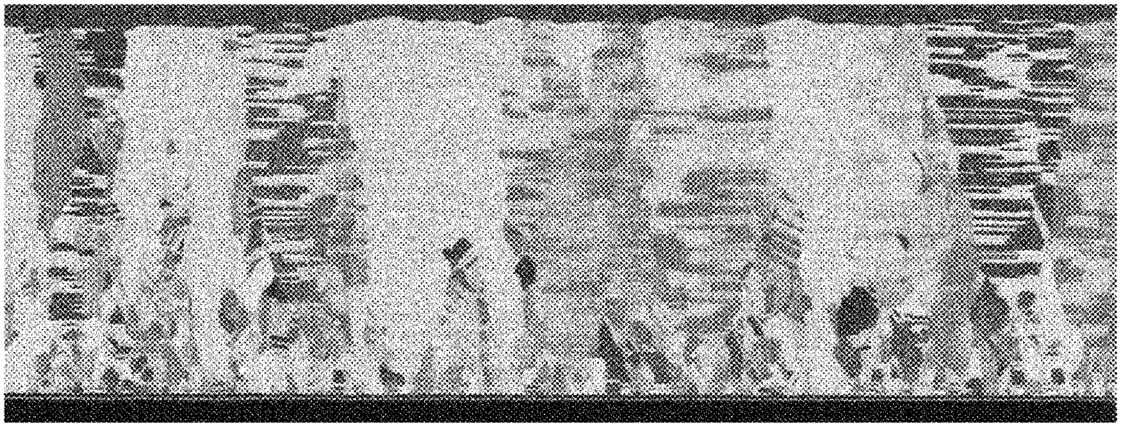
FIG. 3 shows a detailed FIB-SAM picture of a nanotwinned copper layer electrodeposited using a composition according to example 2.3.

A picture of the deposited copper is shown in FIG. 3. The desired nanotwin formation can be easily seen from the horizontally layered structure. The thickness of the transition layer is depicted in table 1.

Example 2.4

Example 2.2 was repeated with 10 ppm of the nanotwin promotor prepared in example 1.4.

Figure 4:
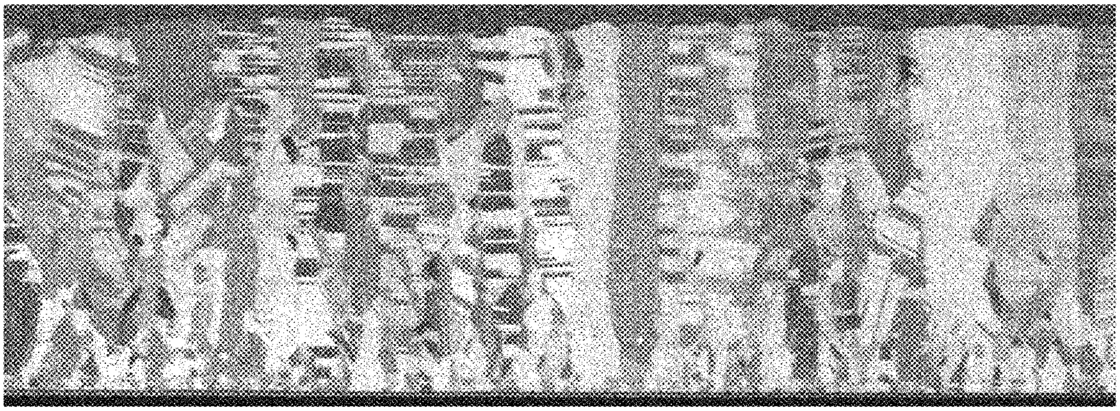
FIG. 4 shows a detailed FIB-SAM picture of a nanotwinned copper layer electrodeposited using a composition according to example 2.4.

A picture of the deposited copper is shown in FIG. 4. The desired nanotwin formation can be easily seen from the horizontally layered structure. The thickness of the transition layer is depicted in table 1.

Example 2.5

Example 2.2 was repeated with 5 ppm of the nanotwin promotor prepared in example 1.5.

Figure 5:
FIG. 5 shows a detailed FIB-SAM picture of a nanotwinned copper layer electrodeposited using a composition according to example 2.5.

A picture of the deposited copper is shown in FIG. 5. The desired nanotwin formation can be easily seen from the horizontally layered structure. The thickness of the transition layer is depicted in table 1.

Example 2.6

Example 2.2 was repeated with 10 ppm of the nanotwin promotor prepared in example 1.6.

Figure 6:
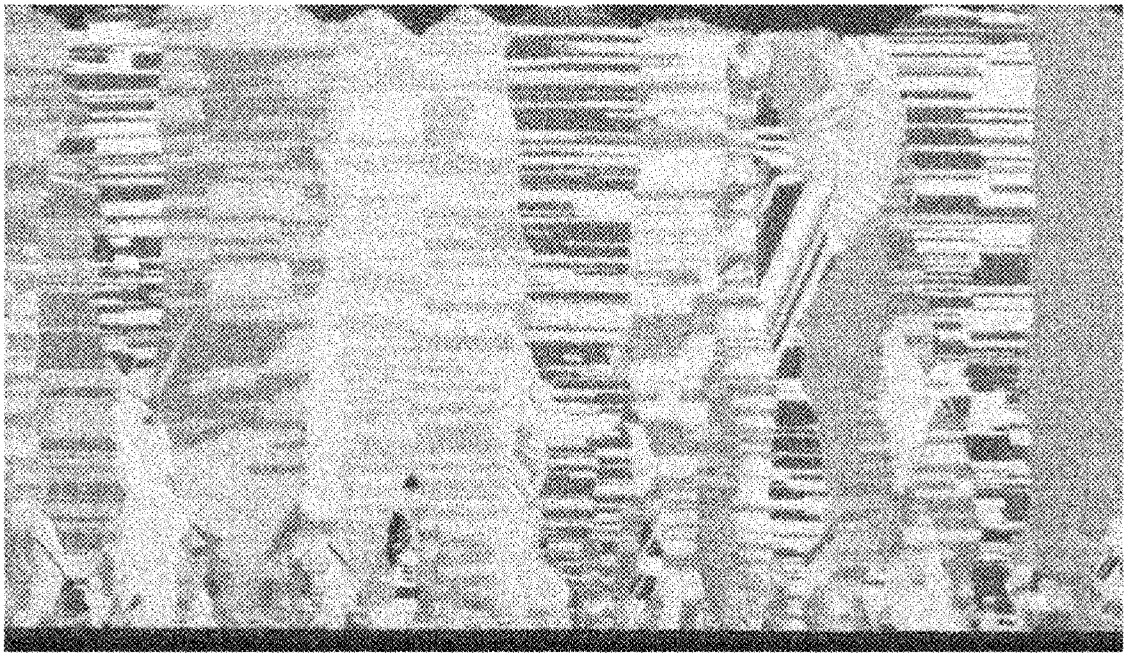
FIG. 6 shows a detailed FIB-SAM picture of a nanotwinned copper layer electrodeposited using a composition according to example 2.6.

A picture of the deposited copper is shown in FIG. 6. The desired nanotwin formation can be easily seen from the horizontally layered structure. The thickness of the transition layer is depicted in table 1.

Example 2.7

Example 2.2 was repeated with 10 ppm of the nanotwin promotor prepared in example 1.7.

Figure 7:
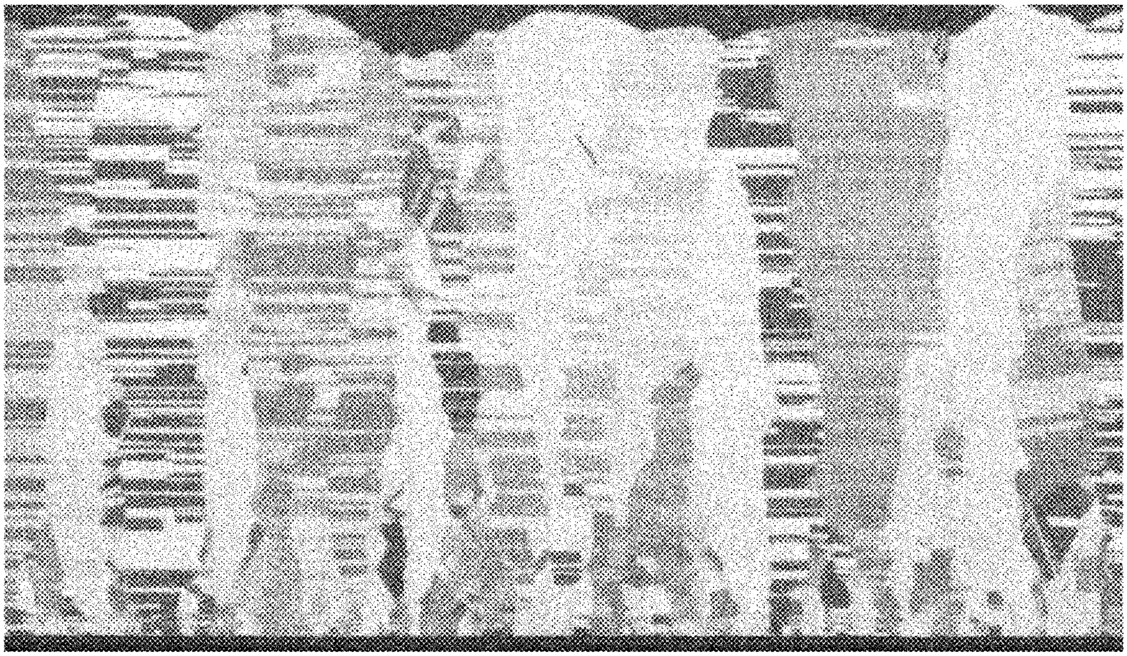
FIG. 7 shows a detailed FIB-SAM picture of a nanotwinned copper layer electrodeposited using a composition according to example 2.7.

A picture of the deposited copper is shown in FIG. 7. The desired nanotwin formation can be easily seen from the horizontally layered structure. The thickness of the transition layer is depicted in table 2.

Example 2.8

Example 2.2 was repeated with 10 ppm of the nanotwin promotor prepared in example 1.8.

Figure 8:
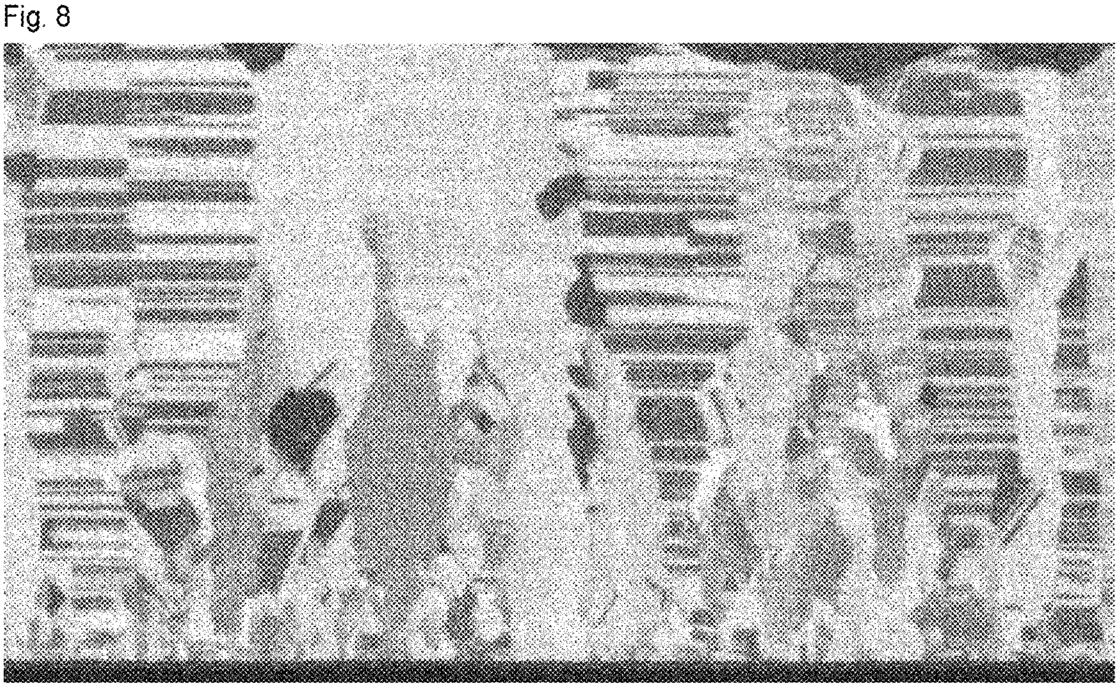
FIG. 8 shows a detailed FIB-SAM picture of a nanotwinned copper layer electrodeposited using a composition according to example 2.8.

A picture of the deposited copper is shown in FIG. 8. The desired nanotwin formation can be easily seen from the horizontally layered structure. The thickness of the transition layer is depicted in table 2.

Example 2.9

Example 2.2 was repeated with 80 ppm of the nanotwin promotor prepared in example 1.9.

Figure 9:
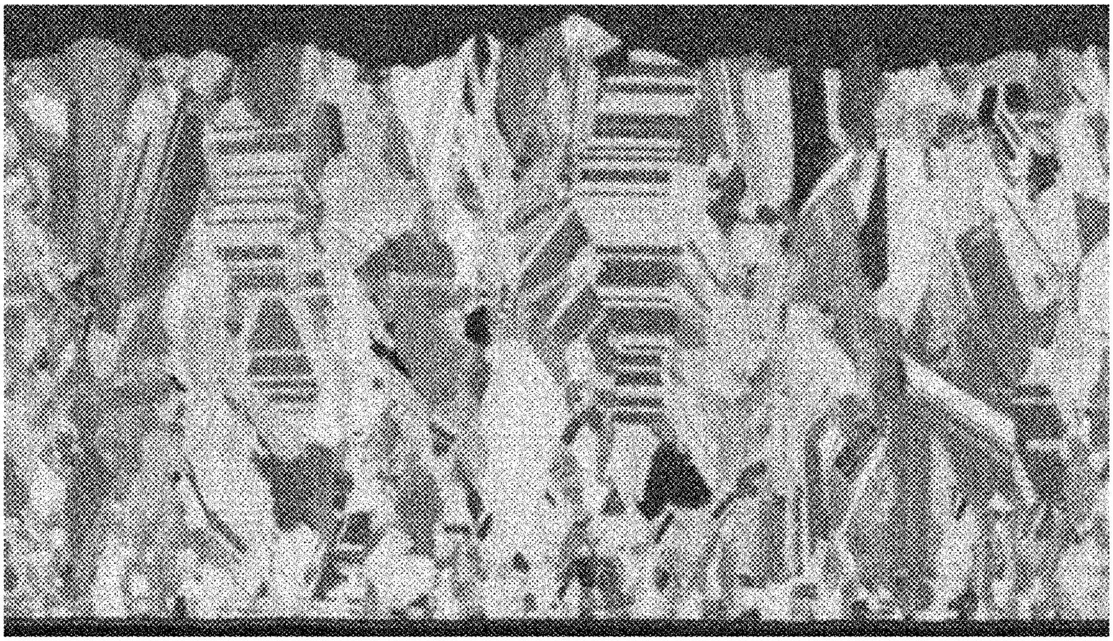
FIG. 9 shows a detailed FIB-SAM picture of a nanotwinned copper layer electrodeposited using a composition according to example 2.9.

A picture of the deposited copper is shown in FIG. 9. Even if the use of higher amounts of comonomer reduces the amount of nanotwins formed during electrodeposition, the desired nanotwin formation can be seen from the horizontally layered structures. The thickness of the transition layer could not be determined in this case.

TABLE 1

| Example | Nanotwin Promotor | Conc. [ppm] | Transition layer [μm] |
|---|---|---|---|
| 2.1 | Poly(propylene glycol) bis(2-aminopropyl ether* + Dimethylglycine + Epichlorohydrine | 10 | 2.5 |
| 2.2 | 1,4-Diaminobutane + Dimethylglycine + Epichlorohydrine | 10 | 0.59 |
| 2.3 | 1,2-Propylenediamine + Dimethylglycine + Epichlorohydrine | 200 | 0.66 |
| 2.4 | 1,2-Ethylenediamine + Dimethylglycine + Epichlorohydrine | 10 | 0.93 |
| 2.5 | 1,6-Hexanediamine + Dimethylglycine + Epichlorohydrine | 5 | 3.00 |

TABLE 1-continued

| Example | Nanotwin Promotor | Conc. [ppm] | Transition layer [μm] |
|---|---|---|---|
| 2.6 | Diethylenetriamine + Dimethylglycine + Epichlorohydrine | 10 | 0.72 |

*Degree of polymerization of approx 2

TABLE 2

| Example | Nanotwin Promotor | Conc. [ppm] | Transition layer [μm] |
|---|---|---|---|
| 2.7 | 1,4-Diaminobutane + Dimethylglycine) + Comonomer (molar ratio 95:5) + Epichlorohydrine | 10 | 0.67 |
| 2.8 | (Dimethylglycine + Diaminobutane) + Comonomer (molar ratio 99.4:0.6) + EPI | 10 | 1.23 |
| 2.9 | (Dimethylglycine + Diaminobutane) + Comonomer (molar ratio: 27.3:72.7) + EPI | 80 | not determined |

The invention claimed is:

1. A method of using a polyaminoamide comprising a group of formula N1

$$[B—A—B'—Z]_n[Y—Z]_m, \quad (N1)$$

the method comprising using the polyaminoamide in a composition for electrodepositing nanotwinned copper, wherein B, B' are the same or different, and are aminoacid fragments of formula N2a (N2a)

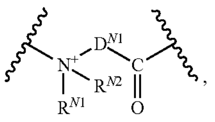

or of Formula N2b (N2b)

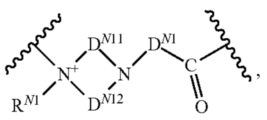

or of Formula N2c (N2c)

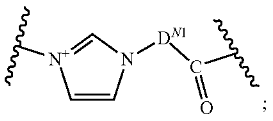

A is a diamine fragment independently selected from the group consisting of formula N3a (N3a)

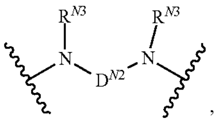

and of Formula N3b (N3b)

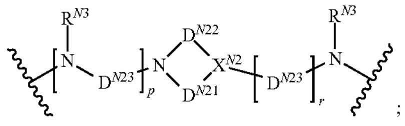

$D^{N1}$ is a divalent group selected from the group consisting of (a) a $C_1$-$C_{20}$-alkanediyl which may optionally be substituted by an amino group or interrupted by a double bond or an imino group, and (b) an ether or polyether group of formula N2c $$[D^{N10}—O—]_o D^{N10}—; \quad (N2c)$$

$D^{N2}$ is a divalent group selected from the group consisting of (a) a linear, branched or cyclic $C_1$ to $C_{20}$ alkanediyl, which may optionally be interrupted by one or more $NR^{N10}$, or substituted by one or more groups $NR^{N10}R^{N11}$ or $OR^{N10}$, (b) $-D^{N13}-Ar^{N13}-D^{N13}-$; and (c) an ether or polyether group of formula N2c;

$D^{N10}$ is selected from the group consisting of a linear or branched $C_1$-$C_6$-alkanediyl;

$D^{N13}$ is selected from the group consisting of a $C_1$-$C_6$-alkanediyl;

$Ar^{N13}$ is a $C_6$ to $C_{10}$ aromatic moiety;

$D^{N11}$,$D^{N12}$ are (a) independently selected from the group consisting of a linear or branched $C_1$ to $C_6$ alkanediyl, or (b) both, together with the adjacent two N atoms, part of a 5 or 6-membered aromatic heterocyclic ring system;

$D^{N21}$,$D^{N22}$ are (a) independently selected from the group consisting of a linear or branched $C_1$ to $C_6$ alkanediyl, or (b) both, together with the adjacent two N atoms, part of a 5 or 6-membered aromatic heterocyclic ring system;

$D^{N23}$ is a $C_1$ to $C_6$ alkanediyl;

$R^{N1}$, $R^{N2}$ are independently selected from the group consisting of a $C_1$ to $C_6$ alkyl;

$R^{N3}$ is selected from the group consisting of H and a $C_1$ to $C_6$ alkyl;

$R^{N10}$, $R^{N11}$ are independently selected from the group consisting of H and a linear or branched $C_1$ to $C_6$ alkanediyl;

$X^{N2}$ is N or $CR^{N3}$.

Y is a diamine comonomer fragment;

Z is a divalent coupling fragment of formula N4

(N4)

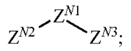

$Z^{N1}$ is selected from the group consisting of (a) a linear or branched $C_1$ to $C_{12}$ alkanediyl, which may be interrupted by one or more O atoms, and (b) a divalent group $-D^{N11}-Ar^{N11}-D^{N11}-$;

$Z^{N2}$, $Z^{N3}$ are independently selected from the group consisting of a chemical bond and hydroxyethanediyl;

n is an integer of from 1 to 400;

m is 0 or an integer of from 1 to 400;

o is an integer of from 1 to 6; and p, r are independently 0 or 1;

wherein the ratio of nim is at least 25:75.

2. The method according to claim 1, wherein B and B' are the same or different, and are aminoacid fragments of formula N2a, wherein $D^{N1}$ is selected from the group consisting of (i) a linear $C_2$ to $C_{10}$ alkanediyl group, (ii) a $C_2$ to $C_3$ oxyalkylene group, (iii) a cyclic $C_6$ to $C_{12}$ alkanediyl group, and (iv) a divalent phenyl or pyridyl group.

3. The method according to claim 1, wherein B and B' are the same or different, and are a fragment of formula N2b, wherein (a) $D^{N11}$ and $D^{N12}$ are independently selected from the group consisting of a linear or branched $C_1$ to $C_4$ alkanediyl, or (b) $D^{N11}$ and $D^{N12}$, together with the two adjacent N atoms, form an imidazole ring.

4. The method according to claim 1, wherein A is a fragment of formula N3a, wherein $D^{N2}$ is selected from the group consisting of methanediyl, ethanediyl, and 1,3-propanediyl.

5. The method according to claim 1, wherein A is a fragment of formula N3a, wherein $D^{N2}$ is selected from the group consisting of an ether or polyether group of formula N2a $$—[D^{N10}—O—]_o D^{N10}—, \qquad (N2a)$$

wherein $D^{N10}$ is selected from the group consisting of a $C_1$-$C_4$-alkanediyl and o is an integer from 1 to 5.

6. The method according to claim 1, wherein the polyaminoamide is

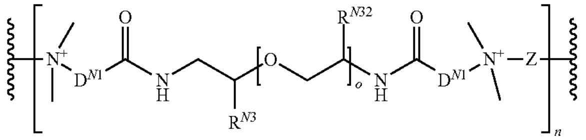

wherein $D^{N1}$ is selected from the group consisting of methanediyl, ethanediyl, propanediyl and butanediyl;

$R^{N3}$ is selected from the group consisting of H, methyl and ethyl;

$R^{N32}$ is selected from the group consisting of H, methyl and ethyl; and

Z is $—CH_2—CH(OH)—CH_2—$.

7. The method of using the polyaminoamide according to claim 6, wherein $R^{N3}$ is H or methyl and $R^{N32}$ is H or methyl.

8. The method according to claim 1, wherein A is a fragment of formula N3b, wherein $D^{N21}$, $D^{N22}$, and $D^{N23}$ are independently selected from the group consisting of methanediyl, ethanediyl, and propanediyl.

9. The method according to claim 1, wherein A is a fragment of formula N3b, wherein $D^{N21}$ and $D^{N22}$, together with the two adjacent N atoms, form an imidazole ring and $D^{N23}$ is selected from the group consisting of methanediyl, ethanediyl, propanediyl and butanediyl.

10. The method according to claim 1, wherein Z is selected from the group consisting of $C_1$ to $C_{12}$ alkanediyl, a bis(2-ethanediyl)ether group, 2-hydroxypropane-1,3-diyl, and 4,4'-bis(methyl)biphenyl.

11. The method according to claim 1, wherein n is an integer from 2 to 200.

12. The method according to claim 1, wherein m is 0 or an integer from 1 to 200.

13. The method according to claim 1, wherein the ratio of n:m is at least 50:50.

14. The method according to claim 1, wherein the mass average molecular weight $M_w$ of the polyaminoamide is of from 450 g/mol to 150 000 g/mol.

15. The method of using the polyaminoamide according to claim 1, wherein n is an integer from 2 to 150.

16. The method of using the polyaminoamide according to claim 1, wherein m is 0 or an integer from 2 to 150.

17. The method of using the polyaminoamide according to claim 1, wherein the ratio of n:m is 70:30.

* * * * *